(12) United States Patent
Matsuoka et al.

(10) Patent No.: US 11,899,278 B2
(45) Date of Patent: Feb. 13, 2024

(54) IMAGING LENS AND IMAGING APPARATUS

(71) Applicant: Sony Corporation, Tokyo (JP)

(72) Inventors: Ora Matsuoka, Tokyo (JP); Naoki Miyagawa, Kanagawa (JP); Hiroyuki Matsumoto, Tokyo (JP)

(73) Assignee: Sony Group Corporation, Tokyo (JP)

( * ) Notice: Subject to any disclaimer, the term of this patent is extended or adjusted under 35 U.S.C. 154(b) by 775 days.

(21) Appl. No.: 17/040,957

(22) PCT Filed: Feb. 4, 2019

(86) PCT No.: PCT/JP2019/003857
§ 371 (c)(1),
(2) Date: Sep. 23, 2020

(87) PCT Pub. No.: WO2019/187633
PCT Pub. Date: Oct. 3, 2019

(65) Prior Publication Data
US 2021/0026105 A1 Jan. 28, 2021

(30) Foreign Application Priority Data
Mar. 30, 2018 (JP) .................... 2018-067276

(51) Int. Cl.
*G02B 9/00* (2006.01)
*G02B 9/34* (2006.01)
(Continued)

(52) U.S. Cl.
CPC ............... *G02B 9/34* (2013.01); *G02B 9/60* (2013.01); *G02B 13/18* (2013.01); *G02B 27/0025* (2013.01)

(58) Field of Classification Search
CPC ............... G02B 9/34–58; G02B 13/04; G02B 15/144–144515; G02B 15/00–28; G02B 13/02; G02B 9/00–64
(Continued)

(56) References Cited

U.S. PATENT DOCUMENTS

2017/0068108 A1* 3/2017 Kim .................... G02B 27/646
2017/0102523 A1* 4/2017 Chen .................... G02B 5/208
2017/0176721 A1 6/2017 Kim

FOREIGN PATENT DOCUMENTS

JP H04110811 A 4/1992
JP 09-159911 A 6/1997
(Continued)

*Primary Examiner* — James C. Jones
*Assistant Examiner* — Henry Duong
(74) *Attorney, Agent, or Firm* — Michael Best & Friedrich LLP

(57) ABSTRACT

An imaging lens with better performance including in focusing is disclosed. A first lens group always fixed and having positive refractive power, and a first focus lens group that moves in an optical axis direction at the time of focusing are included in order from the object side to the image side. A last lens group always fixed and having negative refractive power, and a second focus lens group that moves in an optical axis direction at the time of focusing are included in order from the image side to the object side. At least one of the first focus lens group or the second focus lens group has negative refractive power. The conditional expression 0.4<f/ff<1.0, where f: the focal length of the whole system, and ff: the combined focal length from the first lens group to the first focus lens group, is preferably satisfied.

7 Claims, 26 Drawing Sheets

(51) Int. Cl.
*G02B 9/60* (2006.01)
*G02B 13/18* (2006.01)
*G02B 27/00* (2006.01)

(58) Field of Classification Search
USPC .................................. 359/676–695, 745–795
See application file for complete search history.

(56) References Cited

FOREIGN PATENT DOCUMENTS

| | | | |
|---|---|---|---|
| JP | 2009229516 A | | 10/2009 |
| JP | 2012220828 A | | 11/2012 |
| JP | 2014006487 A | * | 1/2014 |
| JP | 2017-173409 A | | 9/2017 |

* cited by examiner

IMAGING LENS AND IMAGING APPARATUS

TECHNICAL FIELD

The present technology relates particularly to the technical field of an imaging lens suitable for an interchangeable lens that can be mounted on a digital still camera or a digital mirrorless camera, and an imaging apparatus using this imaging lens.

BACKGROUND ART

In recent years, the numbers of pixels of image pickup devices used in lens-interchangeable digital camera systems have been increasing rapidly. In order to record higher-resolution images, higher rendering performance is also demanded of imaging lenses in addition to the higher pixel counts of the image pickup devices. There is thus a demand for imaging lenses that reduce the occurrence of aberration more than ever before.

Furthermore, increasing numbers of users take moving images as well as taking still images using lens-interchangeable digital camera systems. In a moving image take, it is necessary to move a focus lens group at high speed to keep focusing on subjects. Thus, it is also demanded of imaging lenses to be able to focus at high speed as an important factor.

Under such circumstances, various types of imaging lenses have been proposed (see Patent Documents 1 and 2, for example).

For an imaging lens described in Patent Document 1, an imaging lens is proposed in which a first positive lens group, an aperture stop, a second negative lens group, and a third positive lens group are disposed in order from the object side to the image side. At the time of focusing from an object at infinity to an object at close range, the second lens group moves from the object side to the image side in an optical axis direction. Since the second lens group is the sole group contributing to focusing, it has the characteristics of a simple configuration and a light weight.

On the other hand, the imaging lens described in Patent Document 1 does not sufficiently correct aberration occurring in the first lens group and the second lens group, particularly spherical aberration and axial chromatic aberration, and is not suitable for an imaging lens of a digital camera system with a high pixel count. Furthermore, the curvature of field is increased at the time of focusing on an object at close range.

Patent Document 2 proposes a floating optical system that performs focusing by moving a plurality of focus lens groups by different moving amounts. In this optical system, a first positive lens group, a second negative lens group, an aperture stop, a third positive lens group, and a fourth negative lens group are disposed in order from the object side to the image side. At the time of focusing from an object at infinity to an object at close range, the second lens group moves from the object side to the image side in an optical axis direction, and the third lens group moves from the image side to the object side in an optical axis direction. By adopting the floating system, it has the characteristic of being able to reduce variations in curvature of field and distortion due to focusing.

On the other hand, in the imaging lens described in Patent Document 2, the optical effective diameter of the second lens group as a focus lens group is about 47 mm, and the optical effective diameter of the third lens group is about 34 mm. Both are large in optical effective diameter and also large in weight.

Furthermore, both of the imaging lenses described in Patent Documents 1 and 2 have a large total optical length of about 160 mm.

CITATION LIST

Patent Documents

Patent Document 1: Japanese Patent Application Laid-Open No. 9-159911
Patent Document 2: Japanese Patent Application Laid-Open No. 2017-173409

SUMMARY OF THE INVENTION

Problems to be Solved by the Invention

By the way, in recent years, many digital cameras have had both functions of capturing still images and moving images. It is required to enable wobbling at the time of capturing moving images, in addition to increasing autofocus speed at the time of capturing still images. Wobbling means that a lens group is moved infinitesimally in an optical axis direction using a contrast method, to detect an in-focus position at the time of autofocusing.

Furthermore, in imaging apparatuses that perform focusing and wobbling, one lens group is often used as both a focus lens group and a wobbling lens group. In the present technology, one lens group may also have both functions of focusing and wobbling.

However, the imaging lens described in Patent Document 2, in which the two focus lens groups each have a large optical effective diameter and a large weight, thus has the disadvantage of not being optimum for increasing autofocus speed and wobbling.

It is thus an object of an imaging lens and an imaging apparatus of the present technology to achieve higher performance including better performance in focusing.

Solutions to Problems

First, an imaging lens according to the present technology includes a first lens group always fixed and having positive refractive power, and a first focus lens group that moves in an optical axis direction at the time of focusing from an object at infinity to an object at close range, in order from the object side to the image side, a last lens group always fixed and having negative refractive power, and a second focus lens group that moves in an optical axis direction at the time of focusing from an object at infinity to an object at close range, in order from the image side to the object side, at least one of the first focus lens group or the second focus lens group having negative refractive power, and an aperture stop disposed between the first focus lens group and the second focus lens group, and satisfies Conditional Expression (1) below:

$$0.4 < f/ff < 1.0 \tag{1}$$

where
f: the focal length of the whole system
ff: the combined focal length from the first lens group to the first focus lens group.

This provides an advantage in correcting curvature of field and distortion from imaging at infinity to imaging at unity magnification, and fairly strongly converged axial rays exit from the first focus lens group to the image side.

Second, in the above-described imaging lens, preferably, the first focus lens group has negative refractive power and moves from the object side to the image side in the optical axis direction at the time of focusing from an object at infinity to an object at close range, and the second focus lens group has positive refractive power and moves from the image side to the object side in the optical axis direction at the time of focusing from an object at infinity to an object at close range.

This facilitates increasing the focus sensitivities of the first focus lens group and the second focus lens group.

Third, in the above-described imaging lens, preferably, the first focus lens group includes an object-side lens component having negative refractive power and an image-side lens component having negative refractive power, and the object-side lens component is formed by a cemented lens including a positive lens located on the object side and a negative lens located on the image side.

This allows a glass material with large anomalous dispersion to be disposed on a surface having the largest axial ray diameter in the first focus lens group.

Fourth, in the above-described imaging lens, preferably, a lens located closest to the image side in the first lens group has an aspherical shape on one side or both sides, and the aspherical shape becomes weaker in positive refractive power toward a lens peripheral portion.

This allows a reduction in the number of lenses in addition to distributing negative refractive power among a plurality of lenses in the first lens group.

Fifth, in the above-described imaging lens, preferably, the first lens group includes at least one meniscus lens having negative refractive power, and satisfies Conditional Expression (4) below:

$$1.0 < (r1+r2)/(r1-r2) < 10 \quad (4)$$

where
r1: an object-side surface of a meniscus lens having negative refractive power located closest to the object side in the first lens group
r2: an image-side surface of the meniscus lens having the negative refractive power located closest to the object side in the first lens group.

This optimizes the refractive power of the meniscus lens having the negative refractive power located closest to the object side in the first lens group.

Sixth, in the above-described imaging lens, preferably, the last lens group includes an object-side lens component having positive refractive power and an image-side lens component having negative refractive power, and satisfies Conditional Expression (5) below:

$$-12 < FGL1/FGL2 < -1.5 \quad (5)$$

where
FGL1: the combined focal length of the object-side lens component of the last lens group
FGL2: the combined focal length of the image-side lens component of the last lens group.

This allows the last lens group to separate axial rays and marginal rays, and prevents the negative refractive power of the last lens group from becoming too strong.

Seventh, another imaging lens according to the present technology includes a first lens group always fixed and having positive refractive power, and a first focus lens group that moves from the object side to the image side in an optical axis direction at the time of focusing from an object at infinity to an object at close range, includes at least one positive lens, and has negative refractive power, in order from the object side to the image side, a last lens group always fixed and having negative refractive power, and a second focus lens group that moves from the image side to the object side in an optical axis direction at the time of focusing from an object at infinity to an object at close range, and has positive refractive power, in order from the image side to the object side, and an aperture stop disposed between the first focus lens group and the second focus lens group, and satisfies Conditional Expressions (2) and (3) below:

$$vF1 < 22 \quad (2)$$

$$0.63 < \theta gF \quad (3)$$

where
vF1: the Abbe number for the d-line of the positive lens of the first focus lens group
θgF: the partial dispersion ratio of the positive lens of the first focus lens group.

This provides an advantage in correcting curvature of field and distortion from imaging at infinity to imaging at unity magnification, and also provides an advantage in correcting axial chromatic aberration.

Eighth, in the above-described another imaging lens, preferably, the first focus lens group has negative refractive power and moves from the object side to the image side in the optical axis direction at the time of focusing from an object at infinity to an object at close range, and the second focus lens group has positive refractive power and moves from the image side to the object side in the optical axis direction at the time of focusing from an object at infinity to an object at close range.

This facilitates increasing the focus sensitivities of the first focus lens group and the second focus lens group.

Ninth, in the above-described another imaging lens, preferably, the first focus lens group includes an object-side lens component having negative refractive power and an image-side lens component having negative refractive power, and the object-side lens component is formed by a cemented lens including a positive lens located on the object side and a negative lens located on the image side.

This allows a glass material with large anomalous dispersion to be disposed on a surface having the largest axial ray diameter in the first focus lens group.

Tenth, in the above-described another imaging lens, preferably, a lens located closest to the image side in the first lens group has an aspherical shape on one side or both sides, and the aspherical shape becomes weaker in positive refractive power toward a lens peripheral portion.

This allows a reduction in the number of lenses in addition to distributing negative refractive power among a plurality of lenses in the first lens group.

Eleventh, in the above-described another imaging lens, preferably, the first lens group includes at least one meniscus lens having negative refractive power, and satisfies Conditional Expression (4) below:

$$1.0 < (r1+r2)/(r1-r2) < 10 \quad (4)$$

where
r1: an object-side surface of a meniscus lens having negative refractive power located closest to the object side in the first lens group
r2: an image-side surface of the meniscus lens having the negative refractive power located closest to the object side in the first lens group.

This optimizes the refractive power of the meniscus lens having the negative refractive power located closest to the object side in the first lens group.

Twelfth, in the above-described another imaging lens, preferably, the last lens group includes an object-side lens component having positive refractive power and an image-side lens component having negative refractive power, and satisfies Conditional Expression (5) below:

$$-12 < FGL1/FGL2 < -1.5 \tag{5}$$

where

FGL1: the combined focal length of the object-side lens component of the last lens group FGL2: the combined focal length of the image-side lens component of the last lens group.

This allows the last lens group to separate axial rays and marginal rays, and prevents the negative refractive power of the last lens group from becoming too strong.

Thirteenth, an imaging apparatus according to the present technology includes an imaging lens and an image pickup device that converts an optical image formed by the imaging lens into an electrical signal, the imaging lens including a first lens group always fixed and having positive refractive power, and a first focus lens group that moves in an optical axis direction at the time of focusing from an object at infinity to an object at close range, in order from the object side to the image side, a last lens group always fixed and having negative refractive power, and a second focus lens group that moves in an optical axis direction at the time of focusing from an object at infinity to an object at close range, in order from the image side to the object side, at least one of the first focus lens group or the second focus lens group having negative refractive power, and an aperture stop disposed between the first focus lens group and the second focus lens group, and satisfying Conditional Expression (1) below:

$$0.4 < f/ff < 1.0 \tag{1}$$

where f: the focal length of the whole system ff: the combined focal length from the first lens group to the first focus lens group.

This provides an advantage in the imaging lens in correcting curvature of field and distortion from imaging at infinity to imaging at unity magnification, and fairly strongly converged axial rays exit from the first focus lens group to the image side.

Effects of the Invention

According to the present technology, higher performance including better performance in focusing can be achieved.

Note that the effects described here are not necessarily limiting, and any effect described in the present disclosure may be included.

MODE FOR CARRYING OUT THE INVENTION

Figure 1:
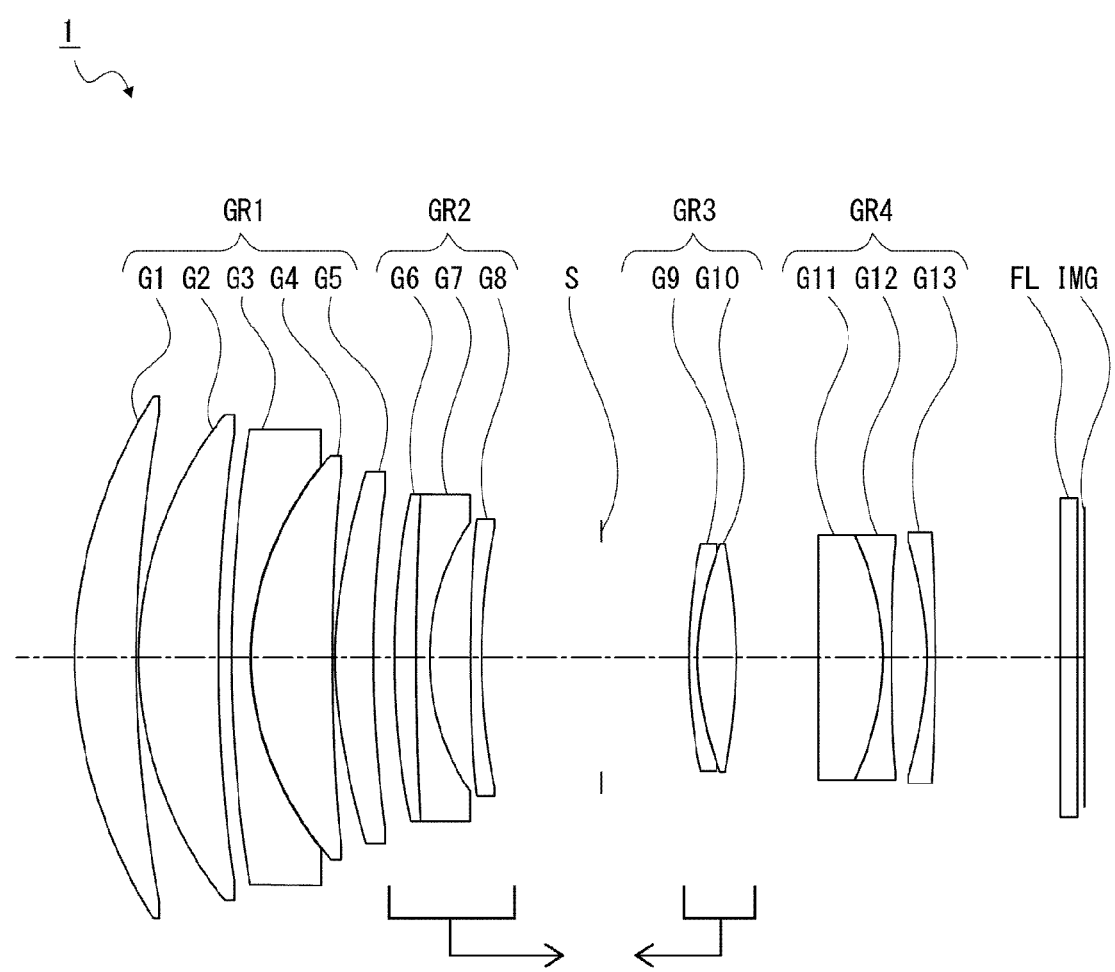
FIG. 1 shows an embodiment of an imaging lens and an imaging apparatus of the present technology together with FIGS. 2 to 26. This figure is a diagram showing a lens configuration of an imaging lens according to a first embodiment.

Hereinafter, a mode for carrying out an imaging lens and an imaging apparatus of the present technology will be described.

[Configuration of Imaging Lens]

The imaging lens of the present technology includes, in order from the object side to the image side, a first lens group always fixed and having positive refractive power, and a first focus lens group that moves in an optical axis direction at the time of focusing from an object at infinity to an object at close range. The imaging lens of the present technology further includes, in order from the image side to the object side, a last lens group always fixed and having negative refractive power, and a second focus lens group that moves in an optical axis direction at the time of focusing from an object at infinity to an object at close range. Moreover, in the imaging lens of the present technology, at least one of the first focus lens group or the second focus lens group has negative refractive power, and an aperture stop is disposed between the first focus lens group and the second focus lens group.

Moving the first focus lens group and the second focus lens group in this manner at the time of focusing provides an advantage in correcting curvature of field and distortion from imaging at infinity to imaging at unity magnification.

Further, by fixing the first lens group with respect to an image surface at the time of focusing, the number of movable groups can be reduced to simplify the mechanical structure.

Moreover, by fixing the last lens group with respect to the image surface at the time of focusing, the number of movable groups can be reduced to simplify the mechanical structure.

Furthermore, fixing the last lens group with respect to the image surface at the time of focusing has the advantage of preventing dust from entering the inside of the imaging lens, in addition to being able to reduce the number of movable groups to simplify the mechanical structure.

Further, by disposing the aperture stop between the first focus lens group and the second focus lens group, refractive power arrangement on the object side and the image side of the aperture stop is optimized, providing an advantage in distortion correction. In a case where a positive lens is disposed on one or both of the object side and the image side of the aperture stop, it is suitable to implement an optical camera shake correction function by moving the positive lens in a direction orthogonal to the optical axis.

The imaging lens of the present technology satisfies Conditional Expression (1) below:

$$0.4 < f/ff < 1.0 \qquad (1)$$

where f: the focal length of the whole system ff: the combined focal length from the first lens group to the first focus lens group.

By satisfying Conditional Expression (1), fairly strongly converged axial rays exit from the first focus lens group to the image side, so that the diameter of the aperture stop located on the image side of the first focus lens group becomes smaller. Furthermore, the lens diameter of the second focus lens group also becomes smaller, and the weight also becomes lighter, so that the second focus lens group can be moved at high speed by an actuator.

On the other hand, if the range of Conditional Expression (1) is exceeded, the absolute values of the refractive powers of the first lens group and the first focus lens group become too large. Consequently, coma and chromatic aberration of magnification cannot be corrected completely, and in addition, the eccentricity sensitivity of the second focus lens group with respect to the first lens group becomes large, making it difficult to stably provide high resolution performance.

On the other hand, if the range of Conditional Expression (1) is not reached, the convergence of axial rays exiting from the first focus lens group is weak, making it difficult to reduce the sizes and weights of the aperture stop and the second focus lens group.

Note that in order to further enhance the effects described above, the range of Conditional Expression (1) is preferably set to the range of Conditional Expression (1)' below:

$$0.4 < f/ff < 0.8 \qquad (1)'$$

where f: the focal length of the whole system ff: the combined focal length from the first lens group to the first focus lens group.

With the configuration as described above, the imaging lens of the present technology can achieve higher performance including better performance in focusing. In particular, an imaging lens can be provided which, while having good optical performance at the time of any focusing from an object at infinity to an object at close range, has a small size and a light weight and is also suitable for capturing moving images.

[Configuration of Another Imaging Lens]

Another imaging lens of the present technology includes, in order from the object side to the image side, a first lens group always fixed and having positive refractive power, and a first focus lens group that moves in an optical axis direction at the time of focusing from an object at infinity to an object at close range. The another imaging lens of the present technology further includes, in order from the image side to the object side, a last lens group always fixed and having negative refractive power, and a second focus lens group that moves in an optical axis direction at the time of focusing from an object at infinity to an object at close range. Moreover, in the another imaging lens of the present technology, at least one of the first focus lens group or the second focus lens group has negative refractive power, and an aperture stop is disposed between the first focus lens group and the second focus lens group.

These components of the another imaging lens of the present technology are similar to the components of the imaging lens of the present technology described above. The another imaging lens of the present technology also provides effects similar to the effects described in the imaging lens of the present technology.

Furthermore, the another imaging lens of the present technology satisfies Conditional Expressions (2) and (3) below:

$$vF1 < 22 \qquad (2)$$

$$0.63 < \theta gF \qquad (3)$$

where
vF1: the Abbe number for the d-line of a positive lens of the first focus lens group
θgF: the partial dispersion ratio of the positive lens of the first focus lens group.

Conditional Expressions (2) and (3) are expressions related to the anomalous dispersion of the glass material of the positive lens included in the first focus lens group.

One way to shorten the total optical length is to shorten the moving distance of a focus lens group. However, in order to maintain the maximum imaging magnification while shortening the moving distance of the focus lens group, it is necessary to increase the absolute value of the refractive power of the focus lens group.

However, if the refractive power of the focus lens group is increased, it becomes difficult to sufficiently correct the aberration of the focus lens group itself, particularly axial chromatic aberration and spherical aberration. In a case where a plurality of focus lens groups is included, axial chromatic aberration is particularly likely to occur in a focus lens group having a larger axial ray diameter.

In the another imaging lens of the present technology, the axial ray diameter of the first focus lens group is larger than the axial ray diameter of the second focus lens group. Thus, by satisfying Conditional Expressions (2) and (3), axial chromatic aberration can be sufficiently corrected.

On the other hand, if the range of Conditional Expression (2) is exceeded, the correction of axial chromatic aberration occurring in the first focus lens group becomes insufficient.

On the other hand, if the range of Conditional Expression (3) is not reached, the correction of axial chromatic aberration occurring in the first focus lens group becomes insufficient.

With the configuration as described above, the another imaging lens of the present technology can achieve higher performance including better performance in focusing, and, in particular, while having good optical performance at the time of any focusing from an object at infinity to an object at close range, can sufficiently correct axis-shaped chromatic aberration.

[Configuration of Imaging Lens according to Embodiment]

In an imaging lens according to an embodiment of the present technology (including the another present technology. Hereinafter, the same applies to an "imaging lens"), a first focus lens group preferably has negative refractive power and moves from the object side to the image side in an optical axis direction at the time of focusing from an object at infinity to an object at close range.

This facilitates increasing the focus sensitivity of the first focus lens group, providing an advantage in increasing autofocus speed.

Furthermore, the first focus lens group preferably includes at least two or more lenses.

This provides an advantage in correcting axial chromatic aberration and chromatic aberration of magnification.

Furthermore, a second focus lens group preferably has positive refractive power and moves from the image side to the object side in an optical axis direction at the time of focusing from an object at infinity to an object at close range.

This facilitates increasing the focus sensitivity of the second focus lens group, providing an advantage in increasing autofocus speed.

In addition, the second focus lens group preferably includes at least two or more lenses.

This provides an advantage in correcting axial chromatic aberration and chromatic aberration of magnification.

In the imaging lens according to the embodiment of the present technology, preferably, the first focus lens group includes an object-side lens component having negative refractive power and an image-side lens component having negative refractive power, and the object-side lens component is formed by a cemented lens including a positive lens located on the object side and a negative lens located on the image side.

This allows a glass material with great anomalous dispersion to be disposed on a surface having the largest axial ray diameter in the first focus lens group, so that axial chromatic aberration can be corrected more effectively.

In the imaging lens according to the embodiment of the present technology, preferably, a lens located closest to the image side in a first lens group has an aspherical shape on one side or both sides, and the aspherical shape becomes weaker in positive refractive power toward a lens peripheral portion.

This allows a reduction in the number of lenses in addition to distributing negative refractive power among a plurality of lenses in the first lens group, and allows sufficient correction of spherical aberration and sagittal coma flare occurring in the first lens group.

In the imaging lens according to the embodiment of the present technology, the first lens group preferably has at least one meniscus lens having negative refractive power and satisfies Conditional Expression (4) below.

$$1.0 < (r1+r2)/(r1-r2) < 10 \tag{4}$$

where
r1: the object-side surface of a meniscus lens having negative refractive power located closest to the object side in the first lens group
r2: the image-side surface of the meniscus lens having the negative refractive power located closest to the object side in the first lens group.

Conditional Expression (4) is an expression related to the shape factor of the meniscus lens having the negative refractive power located closest to the object side in the first lens group.

By satisfying Conditional Expression (4), sagittal coma flare occurring in a negative lens of the first lens group can be reduced.

On the other hand, if the range of Conditional Expression (4) is exceeded, the refractive power of the meniscus lens having the negative refractive power located closest to the object side in the first lens group becomes too weak, thus resulting in insufficient correction of aberration occurring in the first lens group, particularly spherical aberration, axial chromatic aberration, and distortion.

On the other hand, if the range of Conditional Expression (4) is not reached, the refractive power of the meniscus lens having the negative refractive power located closest to the object side in the first lens group becomes too strong, thus resulting in insufficient correction of sagittal coma flare occurring in the first lens group.

Furthermore, in order to further enhance the effects described above, the range of Conditional Expression (4) is preferably set to the range of Conditional Expression (4)' below:

$$1.0 < (r1+r2)/(r1-r2) < 7.5 \tag{4'}$$

where
r1: the object-side surface of a meniscus lens having negative refractive power located closest to the object side in the first lens group r2: the image-side surface of the meniscus lens having the negative refractive power located closest to the object side in the first lens group.

In the imaging lens according to the embodiment of the present technology, a last lens group preferably includes an object-side lens component having positive refractive power and an image-side lens component having negative refractive power, and satisfies Conditional Expression (5) below:

$$-12 < FGL1/FGL2 < -1.5 \quad (5)$$

where
FGL1: the combined focal length of the object-side lens component of the last lens group
FGL2: the combined focal length of the image-side lens component of the last lens group.

By satisfying Conditional Expression (5), axial rays are strongly converged by the object-side lens component, thus providing an advantage in correcting aberration of marginal rays by the image-side lens component in addition to reducing spherical aberration and axial chromatic aberration occurring in the last lens group.

On the other hand, if the range of Conditional Expression (5) is exceeded, the last lens group cannot separate axial rays and marginal rays, thus resulting in insufficient correction of aberration of the marginal rays, particularly coma and chromatic aberration of magnification.

On the other hand, if the range of Conditional Expression (5) is not reached, the negative refractive power of the last lens group becomes too strong, resulting in insufficient correction of distortion.

Furthermore, in order to further enhance the effects described above, the range of Conditional Expression (5) is preferably set to the range of Conditional Expression (5)' below:

$$-10 < FGL1/FGL2 < -1.5 \quad (5)'$$

where
FGL1: the combined focal length of the object-side lens component of the last lens group
FGL2: the combined focal length of the image-side lens component of the last lens group.

Note that the image-side surface of a lens closest to the image side in the last lens group is preferably a convex surface.

This allows a reduction in occurrence of ghost.

[Numerical Examples of Imaging Lens]

Hereinafter, specific embodiments of the imaging lens of the present technology and numerical examples in which specific numerical values are applied to the embodiments will be described with reference to the drawings and tables.

Note that the meanings and the like of symbols shown in the following tables and explanations are as described below.

"ri" represents the paraxial radius of curvature of the i-th surface, "di" represents the axial surface distance between the i-th surface and the i+1th surface (the central thickness of a lens or an air space), "ndi" represents the refractive index at the d-line ($\lambda$=587.6 nm) of a lens or the like starting from the i-th surface, and "vdi" represents the Abbe number for the d-line of the lens or the like starting from the i-th surface.

Regarding "ri", "∞" means that the surface is a flat surface. Regarding "di", "dn (n is zero or a natural number)" means that the distance is variable.

"κ" represents a conic constant, and "A", "B", "C", and "D" represent fourth-order, sixth-order, eighth-order, and tenth-order aspherical coefficients, respectively.

"f" represents the focal length of the whole system of an optical system, "Fno" represents an f-number, "ω" represents a half angle of view, "Y" represents an image height, and "L" represents the total length of the optical system.

Note that in the following tables showing the aspherical coefficients, "E-n" represents an exponential expression in base 10, that is, "10 to the negative power of n". For example, "0.12345E-05" represents "0.12345"×(10 to the negative power of five)".

Some of imaging lenses used in the embodiments have a lens surface formed aspherically. An aspherical shape is defined by Expression 1 below, where "x" is a distance from the vertex of a lens surface in an optical axis direction (sag amount), "y" is a height in a direction orthogonal to the optical axis direction (image height), "c" is a paraxial curvature at the vertex of the lens (the reciprocal of a radius of curvature), "κ" is a conic constant, and "A", "B", . . . are fourth-order, sixth-order, . . . aspherical coefficients.

$$x = cy^2/[1+\{1-(1+\kappa)c^2y^2\}^{1/2}] + Ay^4 + By^6 + \quad \text{[Expression 1]}$$

Note that in each embodiment, for an aspherical surface, symbol * is added to the right of its surface number, and for an aperture stop, the description "stop" is added to the right of its surface number.

First Embodiment

FIG. 1 shows a lens configuration of an imaging lens 1 according to a first embodiment of the present technology. Solid-line arrows indicate directions in which movable lens groups move at the time of focusing from an object at infinity to an object at close range.

The imaging lens 1 includes a first lens group GR1 having positive refractive power, a second lens group GR2 having negative refractive power, a third lens group GR3 having positive refractive power, and a fourth lens group GR4 having negative refractive power arranged in order from the object side to the image side.

The first lens group GR1 includes a positive lens G1 in a meniscus shape with the convex surface facing the object side, a positive lens G2 in a meniscus shape with the convex surface facing the object side, a negative lens G3 in a meniscus shape with the convex surface facing the object side, a positive lens G4 in a meniscus shape with the convex surface facing the object side, and a positive lens G5 in a meniscus shape with the convex surface facing the object side arranged in order from the object side to the image side.

The second lens group GR2 includes a cemented lens formed by cementing a positive lens G6 in a meniscus shape with the convex surface facing the object side and a negative lens G7 in a meniscus shape with the convex surface facing the object side, and a negative lens G8 in a meniscus shape with the convex surface facing the object side arranged in order from the object side to the image side.

The second lens group GR2 is provided as a first focus lens group, and moves from the object side to the image side in an optical axis direction at the time of focusing from an object at infinity to an object at close range. The second lens group GR2 includes an object-side lens component having negative refractive power and an image-side lens component having negative refractive power. The object-side lens component includes the positive lens G6 and the negative lens G7. The image-side lens component includes the negative lens G8.

The third lens group GR3 includes a cemented lens formed by cementing a negative lens G9 in a meniscus shape with the convex surface facing the object side and a positive lens G10 in a biconvex shape.

The third lens group GR3 is provided as a second focus lens group, and moves from the image side to the object side in an optical axis direction at the time of focusing from an object at infinity to an object at close range.

The fourth lens group GR4 includes a cemented lens formed by cementing a positive lens G11 in a meniscus shape with the concave surface facing the object side and a negative lens G12 in a biconcave shape, and a negative lens G13 in a meniscus shape with the concave surface facing the object side arranged in order from the object side to the image side.

The fourth lens group GR4 is provided as a last lens group, and includes an object-side lens component having positive refractive power and an image-side lens component having negative refractive power. The object-side lens component includes the positive lens G11 and the negative lens G12. The image-side lens component includes the negative lens G13.

A filter FL is disposed between the fourth lens group GR4 and an image surface IMG.

An aperture stop S is disposed between the second lens group GR2 and the third lens group GR3, and is fixed with respect to the image surface IMG.

Table 1 shows lens data of Numerical Example 1 in which specific numerical values are applied to the imaging lens 1.

TABLE 1

| Surface Number | ri | di | ndi | ν di |
|---|---|---|---|---|
| Object Surface |  | (d0) |  |  |
| 1 | 67.6359 | 8.6799 | 1.61997 | 63.88 |
| 2 | 181.1834 | 0.4000 |  |  |
| 3 | 54.6341 | 11.4782 | 1.43700 | 95.10 |
| 4 | 233.0436 | 1.8824 |  |  |
| 5 | 208.5222 | 2.6500 | 1.72047 | 34.71 |
| 6 | 41.4576 | 0.3000 |  |  |
| 7 | 42.3083 | 11.5000 | 1.59282 | 68.63 |
| 8 | 276.9603 | 0.4000 |  |  |
| 9* | 71.0840 | 5.5858 | 1.58313 | 59.38 |
| 10 | 181.1560 | (d1) |  |  |
| 11 | 122.3523 | 3.1014 | 1.95906 | 17.47 |
| 12 | 473.0091 | 1.9000 | 1.77250 | 49.62 |
| 13 | 34.4892 | 5.9178 |  |  |
| 14 | 294.4306 | 1.6000 | 1.72916 | 54.67 |
| 15 | 94.0758 | (d2) |  |  |
| 16 (Stop) | ∞ | (d3) |  |  |
| 17 | 79.1944 | 1.2500 | 1.74077 | 27.76 |
| 18 | 42.8515 | 5.5000 | 1.61997 | 63.88 |
| 19 | −85.5729 | (d4) |  |  |
| 20 | −692.7243 | 9.1465 | 1.80610 | 33.27 |
| 21 | −38.9500 | 1.2900 | 1.51742 | 52.15 |
| 22 | 278.8445 | 5.0000 |  |  |
| 23 | −51.8751 | 1.2800 | 1.89190 | 37.13 |
| 24 | −292.7369 | 17.8946 |  |  |
| 25 | ∞ | 2.5000 | 1.51680 | 64.20 |
| 26 | ∞ | 1.0000 |  |  |
| Image Surface | ∞ |  |  |  |

Table 2 shows the fourth-order, sixth-order, eighth-order, and tenth-order aspherical coefficients A, B, C, and D of an aspherical surface in Numerical Example 1 together with a conic constant κ.

TABLE 2

| Surface Number | κ | A | B | C | D |
|---|---|---|---|---|---|
| 9 | 0.000000E+00 | −1.343732E−06 | −3.875437E−10 | −7.218747E−14 | 1.266821E−16 |

Table 3 shows the focal length f, the f-number Fno, the half angle of view ω, the image height Y, and the total optical length L in Numerical Example 1.

TABLE 3

| f | 130.950 |
|---|---|
| Fno | 1.854 |
| ω | 9.38 |
| Y | 21.633 |
| L | 145 |

In the imaging lens 1, at the time of focusing, the surface distance d1 between the first lens group GR1 and the second lens group GR2, the surface distance d2 between the second lens group GR2 and the aperture stop S, the surface distance d3 between the aperture stop S and the third lens group GR3, and the surface distance d4 between the third lens group GR3 and the fourth lens group GR4 change. Table 4 shows variable distances of the surface distances in Numerical Example 1 at infinity, an imaging magnification of −0.03, and the closest range.

TABLE 4

| Imaging Magnification | 0.0 | −0.03 | −0.25 |
|---|---|---|---|
| d0 | ∞ | 3944.8322 | 559.6264 |
| d1 | 3.0000 | 3.9603 | 10.8500 |
| d2 | 17.0880 | 16.1277 | 9.2381 |
| d3 | 12.6914 | 11.5986 | 5.9273 |
| d4 | 11.9640 | 13.0568 | 18.7282 |

Table 5 shows the focal lengths of the lens groups in Numerical Example 1.

TABLE 5

| Group | Starting Surface | Focal Length |
|---|---|---|
| GR1 | 1 | 70.146 |
| GR2 | 11 | −49.415 |
| GR3 | 17 | 73.516 |
| GR4 | 20 | −106.474 |

Figure 2:
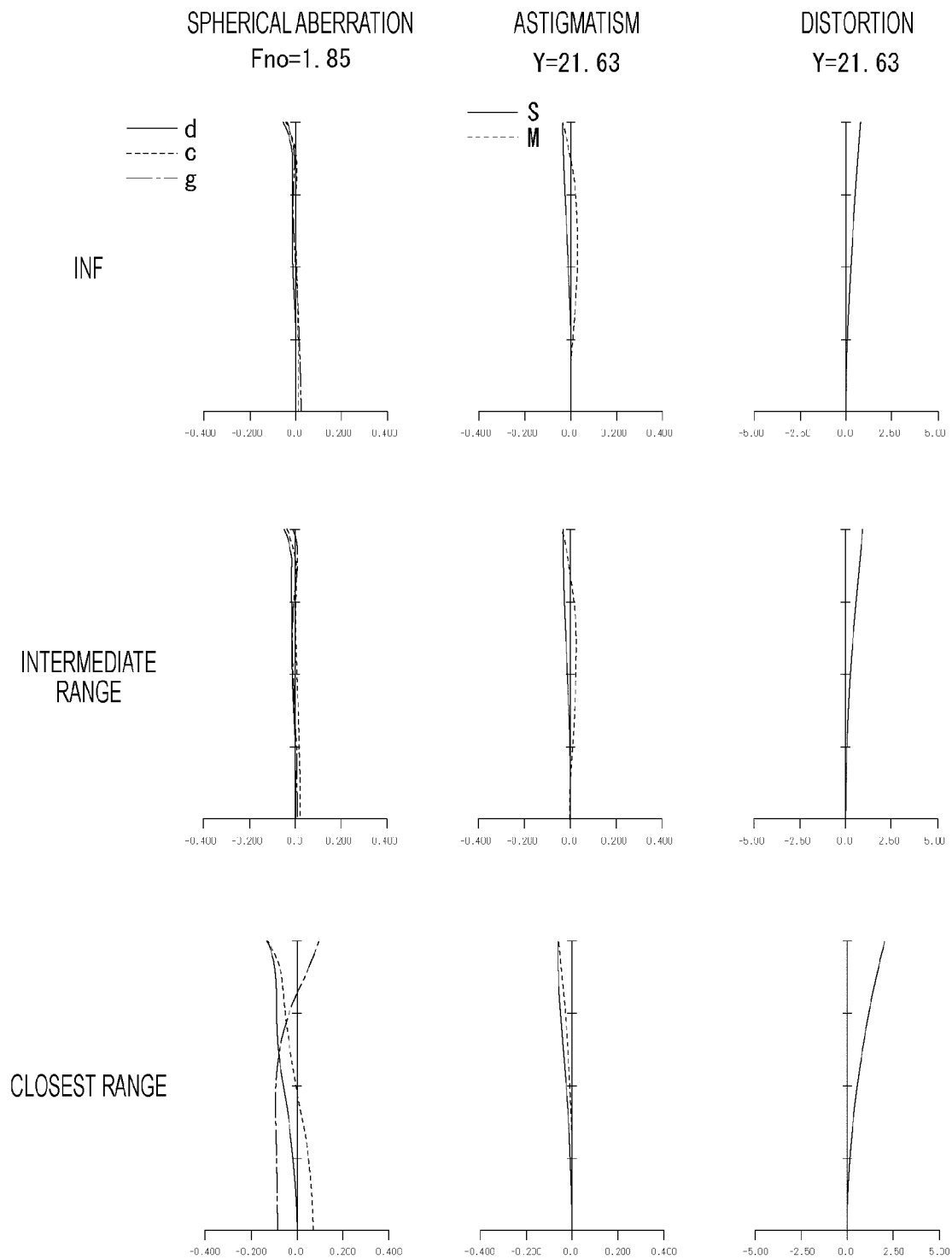
FIG. 2 is a longitudinal aberration diagram in a numerical example in which specific numerical values are applied to the first embodiment, and is a diagram showing spherical aberration, astigmatism, and distortion.
Figure 3:
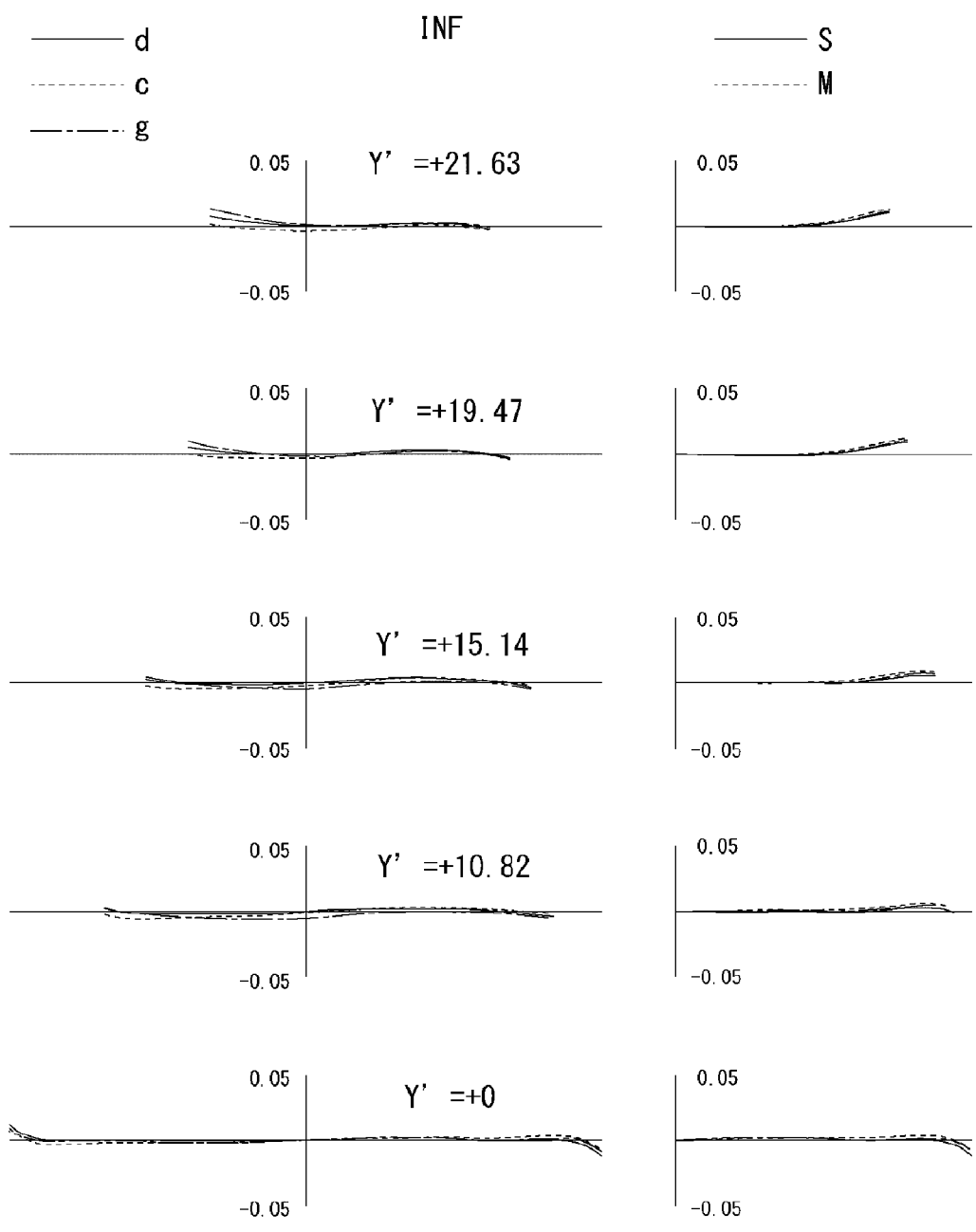
FIG. 3 is a lateral aberration diagram at infinity in the numerical example in which the specific numerical values are applied to the first embodiment.
Figure 4:
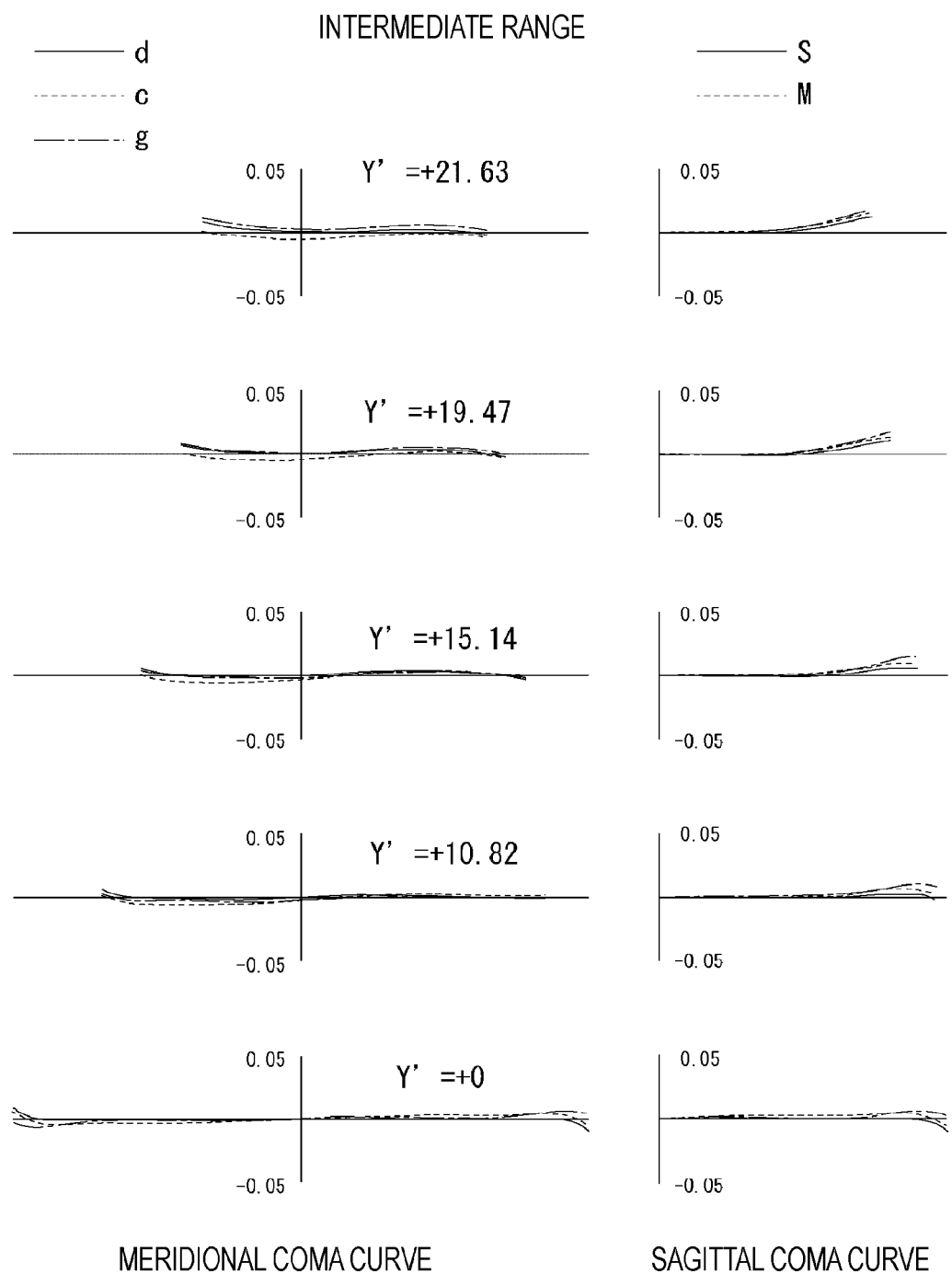
FIG. 4 is a lateral aberration diagram at intermediate range in the numerical example in which the specific numerical values are applied to the first embodiment.
Figure 5:
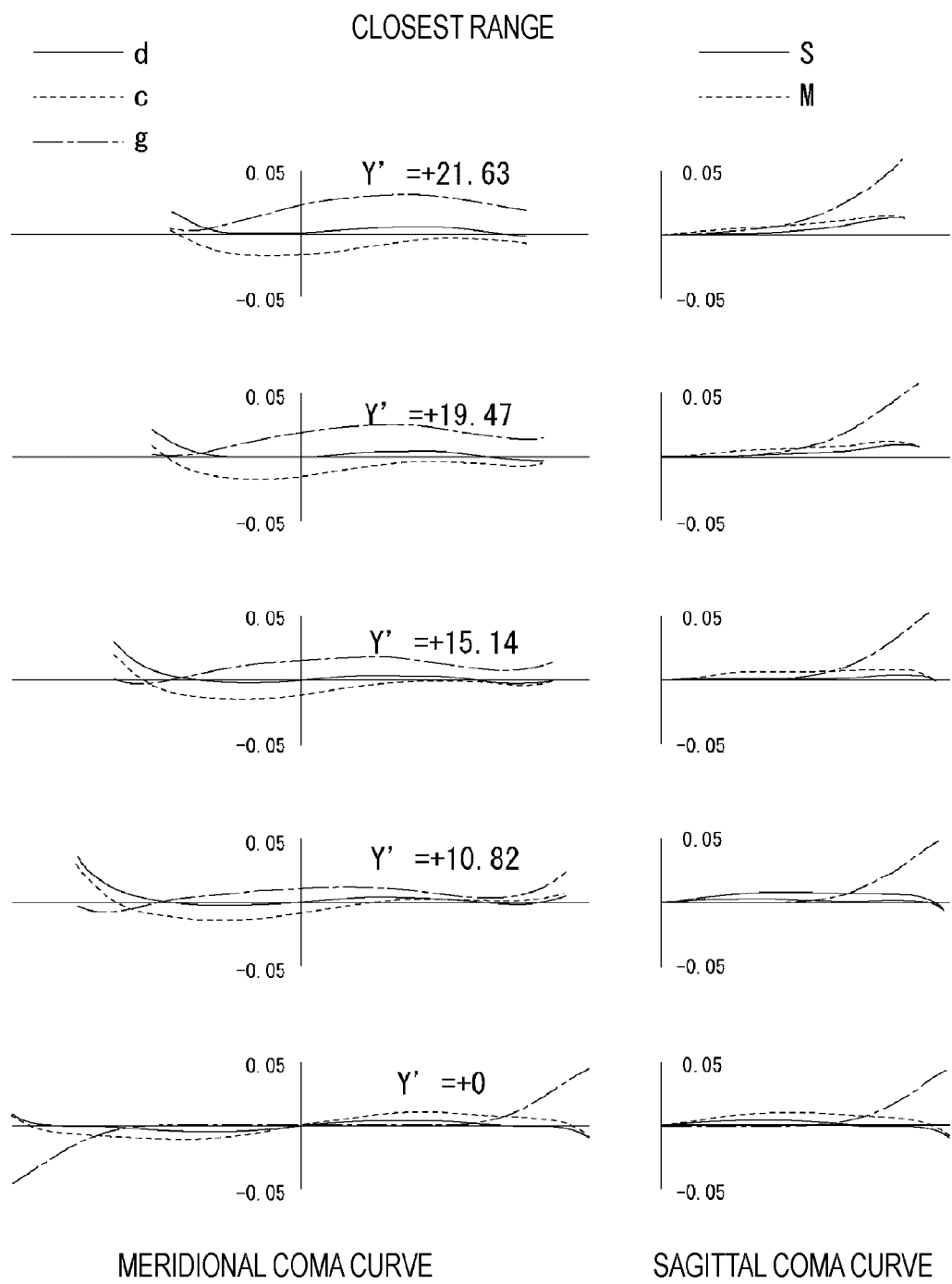
FIG. 5 is a lateral aberration diagram at the closest range in the numerical example in which the specific numerical values are applied to the first embodiment.

FIG. 2 is a longitudinal aberration diagram of Numerical Example 1. FIGS. 3 to 5 are lateral aberration diagrams of Numerical Example 1. FIG. 3 is a lateral aberration diagram at infinity. FIG. 4 is a lateral aberration diagram at intermediate range. FIG. 5 is a lateral aberration diagram at the closest range.

In FIG. 2, in spherical aberration, a solid-line shows the value of the d-line (587.56 nm), a dotted-line shows the value of the c-line (656.27 nm), and a dot-dash line shows the value of the g-line (435.84 nm). In astigmatism, a solid-line shows the value of the d-line in the sagittal image surface, and a broken line shows the value of the d-line in the meridional image surface. In distortion, the value of the d-line is shown. In FIGS. 3 to 5, a solid-line shows the value of the d-line, a dotted-line shows the value of the c-line, a dot-dash line shows the value of the g-line, and Y' represents an image height on an imaging surface.

From the aberration diagrams, it is apparent that Numerical Example 1 favorably corrects various aberrations, and has excellent image formation performance.

Second Embodiment

Figure 6:
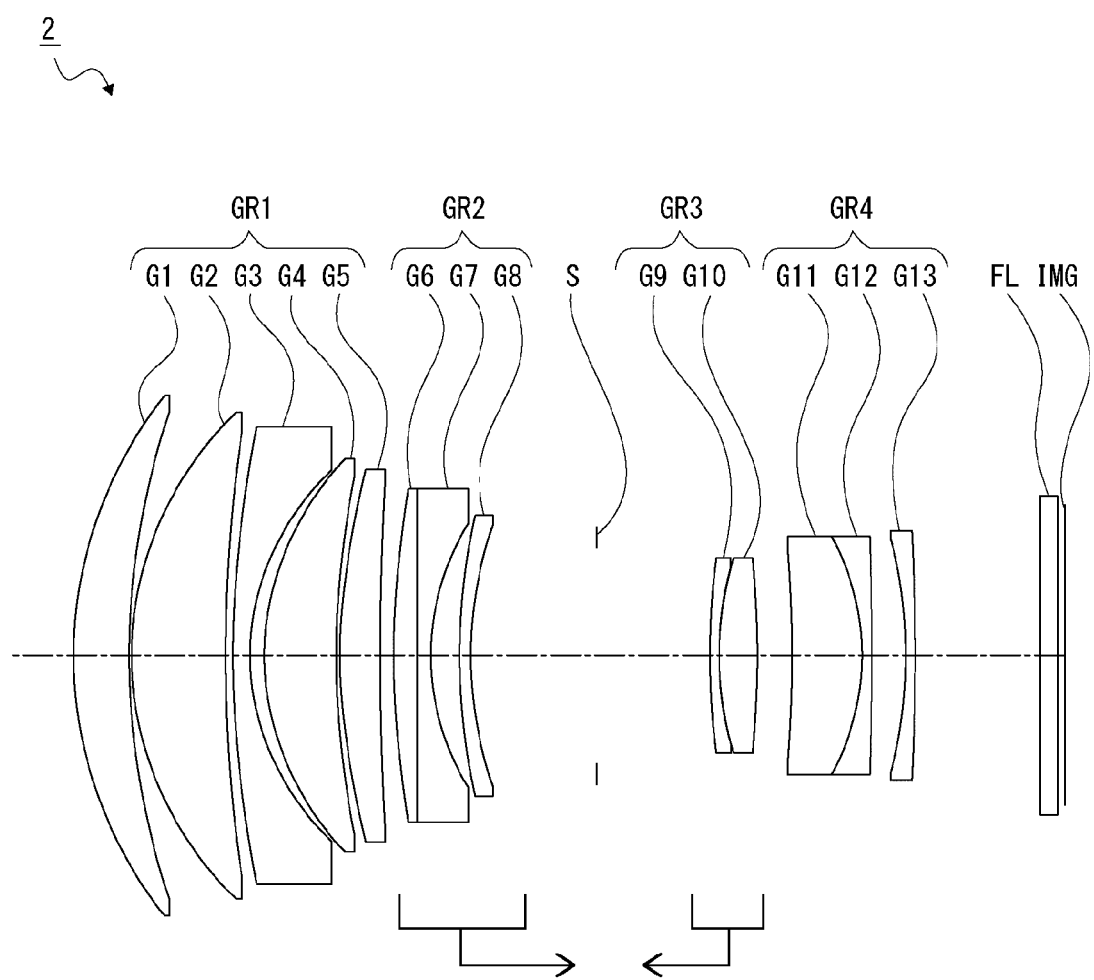
FIG. 6 is a diagram showing a lens configuration of an imaging lens according to a second embodiment.

FIG. 6 shows a lens configuration of an imaging lens 2 according to a second embodiment of the present technology. Solid-line arrows indicate directions in which movable lens groups move at the time of focusing from an object at infinity to an object at close range.

The imaging lens 2 includes a first lens group GR1 having positive refractive power, a second lens group GR2 having negative refractive power, a third lens group GR3 having positive refractive power, and a fourth lens group GR4 having negative refractive power arranged in order from the object side to the image side.

The first lens group GR1 includes a positive lens G1 in a meniscus shape with the convex surface facing the object side, a positive lens G2 in a meniscus shape with the convex surface facing the object side, a negative lens G3 in a meniscus shape with the convex surface facing the object side, a positive lens G4 in a meniscus shape with the convex surface facing the object side, and a positive lens G5 in a meniscus shape with the convex surface facing the object side arranged in order from the object side to the image side.

The second lens group GR2 includes a cemented lens formed by cementing a positive lens G6 in a plano-convex shape with the convex surface facing the object side and a negative lens G7 in a plano-concave shape with the concave surface facing the image side, and a negative lens G8 in a meniscus shape with the convex surface facing the object side arranged in order from the object side to the image side.

The second lens group GR2 is provided as a first focus lens group, and moves from the object side to the image side in an optical axis direction at the time of focusing from an object at infinity to an object at close range. The second lens group GR2 includes an object-side lens component having negative refractive power and an image-side lens component having negative refractive power. The object-side lens component includes the positive lens G6 and the negative lens G7. The image-side lens component includes the negative lens G8.

The third lens group GR3 includes a cemented lens formed by cementing a negative lens G9 in a meniscus shape with the convex surface facing the object side and a positive lens G10 in a biconvex shape.

The third lens group GR3 is provided as a second focus lens group, and moves from the image side to the object side in an optical axis direction at the time of focusing from an object at infinity to an object at close range.

The fourth lens group GR4 includes a cemented lens formed by cementing a positive lens G11 in a meniscus shape with the concave surface facing the object side and a negative lens G12 in a meniscus shape with the concave surface facing the object side, and a negative lens G13 in a meniscus shape with the concave surface facing the object side arranged in order from the object side to the image side.

The fourth lens group GR4 is provided as a last lens group, and includes an object-side lens component having positive refractive power and an image-side lens component having negative refractive power. The object-side lens component includes the positive lens G11 and the negative lens G12. The image-side lens component includes the negative lens G13.

A filter FL is disposed between the fourth lens group GR4 and an image surface IMG.

An aperture stop S is disposed between the second lens group GR2 and the third lens group GR3, and is fixed with respect to the image surface IMG.

Table 6 shows lens data of Numerical Example 2 in which specific numerical values are applied to the imaging lens 2.

TABLE 6

| Surface Number | ri | di | ndi | v di |
|---|---|---|---|---|
| Object Surface | | (d0) | | |
| 1 | 58.892 | 7.9909 | 1.61997 | 63.88 |
| 2 | 107.622 | 0.4 | | |
| 3 | 47.657 | 13.5000 | 1.437 | 95.1 |
| 4 | 211.563 | 1.0000 | | |
| 5 | 156.897 | 2.5 | 1.673 | 38.26 |
| 6 | 35.791 | 2.075729657 | | |
| 7 | 39.725 | 10.29014461 | 1.61997 | 63.88 |
| 8 | 127.161 | 0.5 | | |
| 9* | 77.395 | 5.7859 | 1.58313 | 59.38 |
| 10 | 394.590 | (d1) | | |
| 11 | 137.766 | 3.4230 | 1.94595 | 17.98 |
| 12 | ∞ | 1.9 | 1.673 | 38.26 |
| 13 | 35.702 | 4.1817 | | |
| 14 | 92.537 | 1.6 | 1.64769 | 33.84 |
| 15 | 57.085 | (d2) | | |
| 16 (Stop) | ∞ | (d3) | | |
| 17 | 115.346 | 1.25 | 1.80000 | 29.84 |
| 18 | 46.222 | 5.5 | 1.72916 | 54.67 |
| 19 | −143.730 | (d4) | | |
| 20 | −176.222 | 10.0000 | 1.74950 | 35.33 |
| 21 | −35.941 | 1.29 | 1.51742 | 52.15 |
| 22 | −899.444 | 5 | | |
| 23 | −66.014 | 1.28 | 1.69680 | 55.46 |
| 24 | −439.292 | 18.0500 | | |
| 25 | ∞ | 2.5 | 1.5168 | 64.2 |
| 26 | ∞ | 1 | | |
| Image Surface | ∞ | | | |

Table 7 shows the fourth-order, sixth-order, eighth-order, and tenth-order aspherical coefficients A, B, C, and D of an aspherical surface in Numerical Example 2 together with a conic constant κ.

TABLE 7

| Surface Number | κ | A | B | C | D |
|---|---|---|---|---|---|
| 9 | 0.000000E+00 | −1.762104E−06 | −3.056544E−10 | 1.296020E−13 | 6.425180E−17 |

Table 8 shows the focal length f, the f-number Fno, the half angle of view ω, the image height Y, and the total optical length L in Numerical Example 2.

TABLE 8

| f | 130.967 |
|---|---|
| Fno | 1.854 |
| ω | 9.38 |
| Y | 21.633 |
| L | 142.483 |

In the imaging lens 2, at the time of focusing, the surface distance d1 between the first lens group GR1 and the second lens group GR2, the surface distance d2 between the second lens group GR2 and the aperture stop S, the surface distance d3 between the aperture stop S and the third lens group GR3, and the surface distance d4 between the third lens group GR3 and the fourth lens group GR4 change. Table 9 shows variable distances of the surface distances in Numerical Example 2 at infinity, an imaging magnification of −0.03, and the closest range.

TABLE 9

| Imaging Magnification | 0 | −0.03 | −0.2 |
|---|---|---|---|
| d0 | ∞ | 3927.7215 | 666.5317 |
| d1 | 2 | 3.0878 | 9.408294802 |
| d2 | 17.9940 | 16.9062 | 10.5857 |
| d3 | 16.3845 | 14.7345 | 8.472603217 |
| d4 | 5.0873 | 6.7372 | 12.9992 |

Table 10 shows the focal lengths of the lens groups in Numerical Example 2.

TABLE 10

| Group | Starting Surface | Focal Length |
|---|---|---|
| GR1 | 1 | 72.176 |
| GR2 | 11 | −61.998 |
| GR3 | 17 | 96.415 |
| GR4 | 20 | −164.513 |

Figure 7:
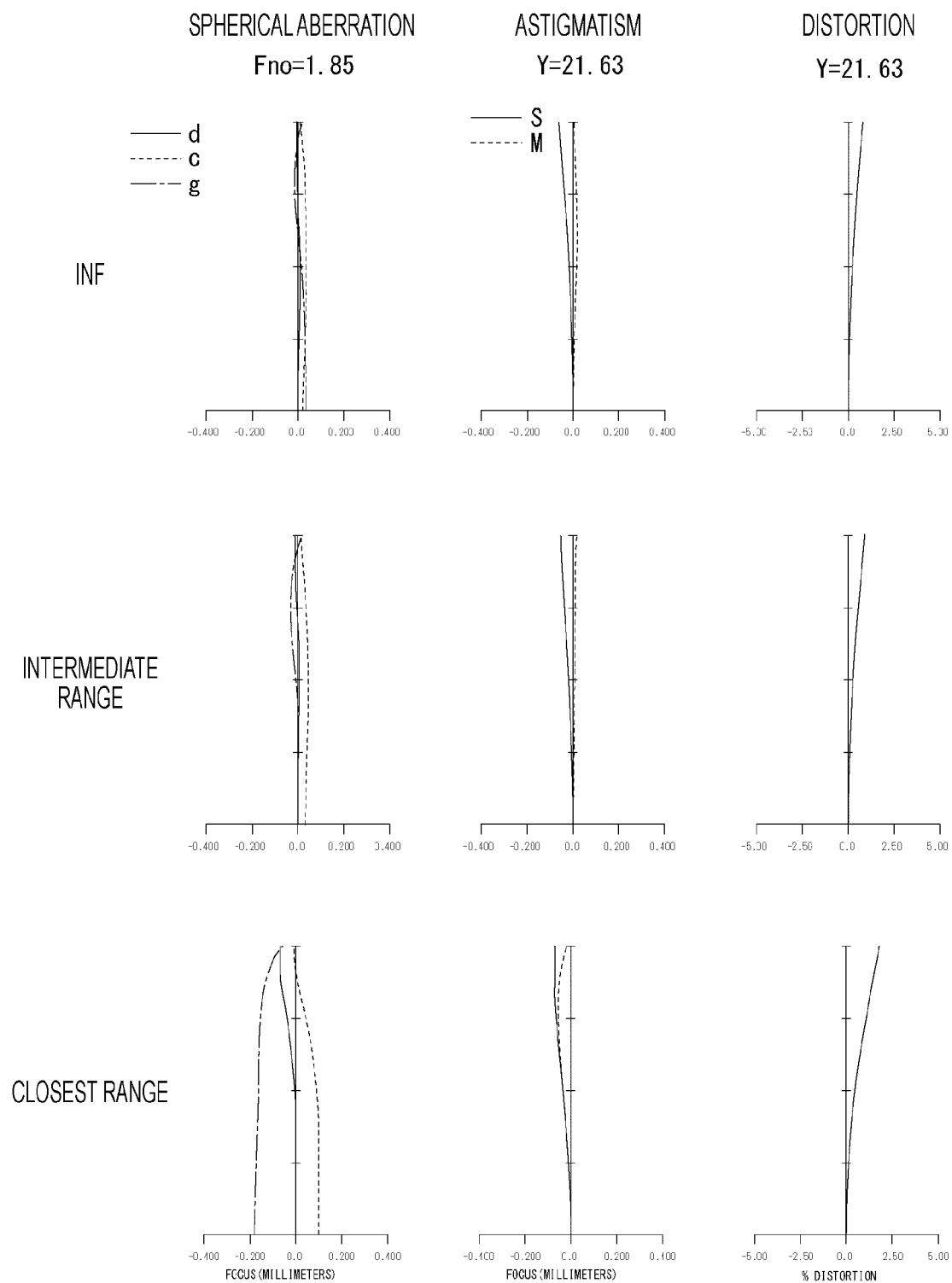
FIG. 7 is a longitudinal aberration diagram in a numerical example in which specific numerical values are applied to the second embodiment, and is a diagram showing spherical aberration, astigmatism, and distortion.
Figure 8:
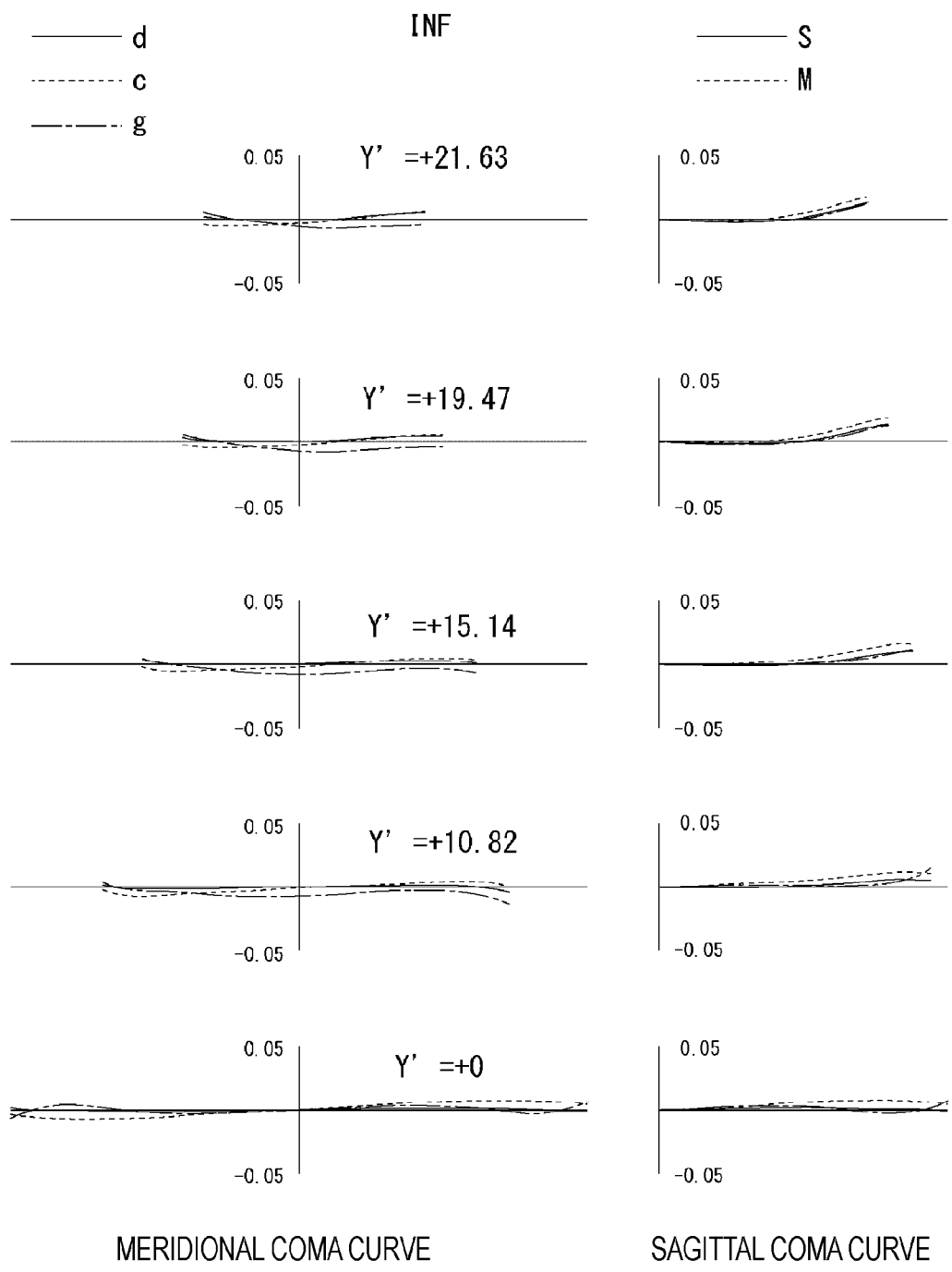
FIG. 8 is a lateral aberration diagram at infinity in the numerical example in which the specific numerical values are applied to the second embodiment.
Figure 9:
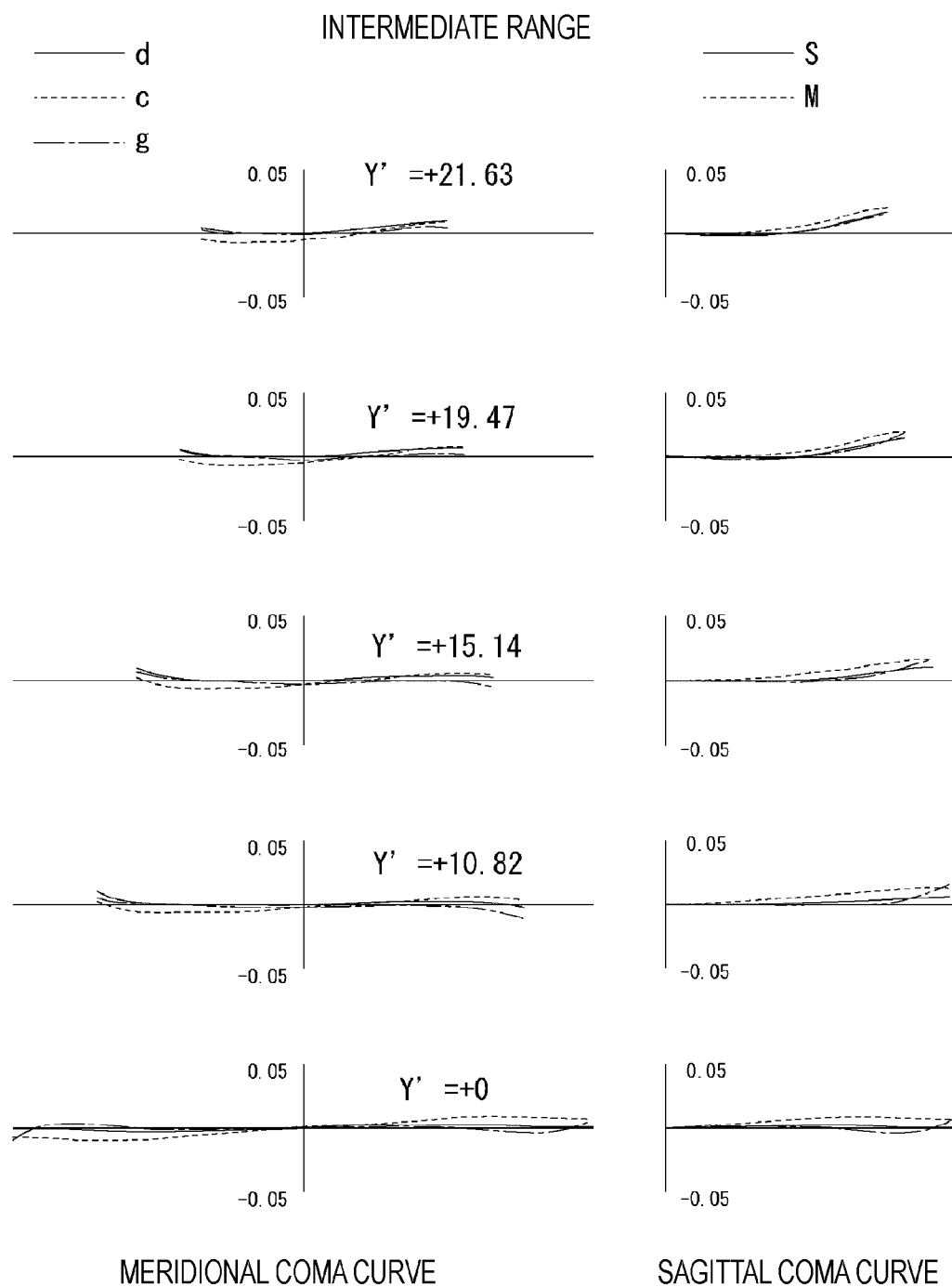
FIG. 9 is a lateral aberration diagram at intermediate range in the numerical example in which the specific numerical values are applied to the second embodiment.
Figure 10:
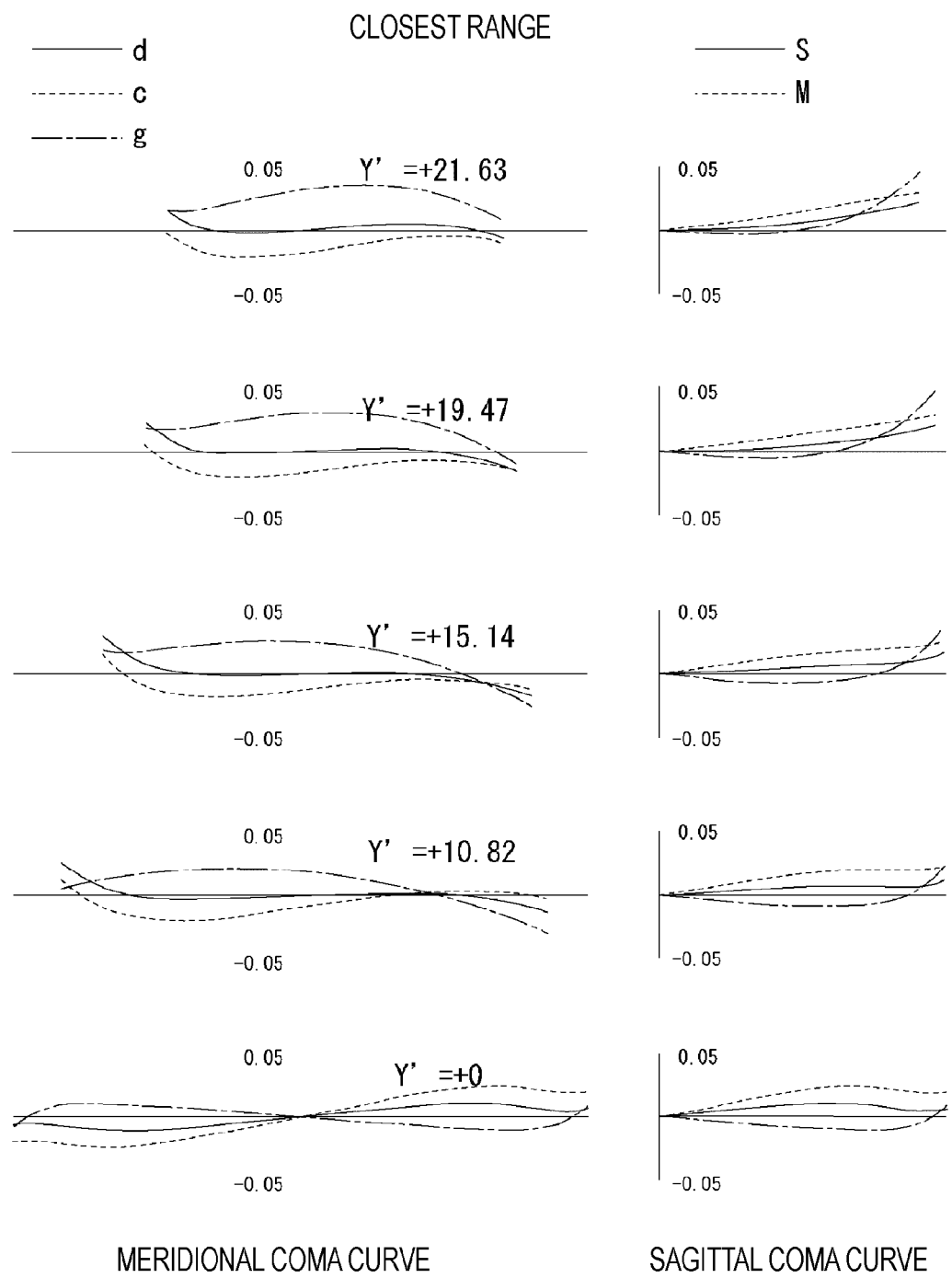
FIG. 10 is a lateral aberration diagram at the closest range in the numerical example in which the specific numerical values are applied to the second embodiment.

FIG. 7 is a longitudinal aberration diagram of Numerical Example 2. FIGS. 8 to 10 are lateral aberration diagrams of Numerical Example 2. FIG. 8 is a lateral aberration diagram at infinity. FIG. 9 is a lateral aberration diagram at intermediate range. FIG. 10 is a lateral aberration diagram at the closest range.

In FIG. 7, in spherical aberration, a solid-line shows the value of the d-line (587.56 nm), a dotted-line shows the value of the c-line (656.27 nm), and a dot-dash line shows the value of the g-line (435.84 nm). In astigmatism, a solid-line shows the value of the d-line in the sagittal image surface, and a broken line shows the value of the d-line in the meridional image surface. In distortion, the value of the d-line is shown. In FIGS. 8 to 10, a solid-line shows the value of the d-line, a dotted-line shows the value of the c-line, a dot-dash line shows the value of the g-line, and Y' represents an image height on an imaging surface.

From the aberration diagrams, it is apparent that Numerical Example 2 favorably corrects various aberrations, and has excellent image formation performance.

Third Embodiment

Figure 11:
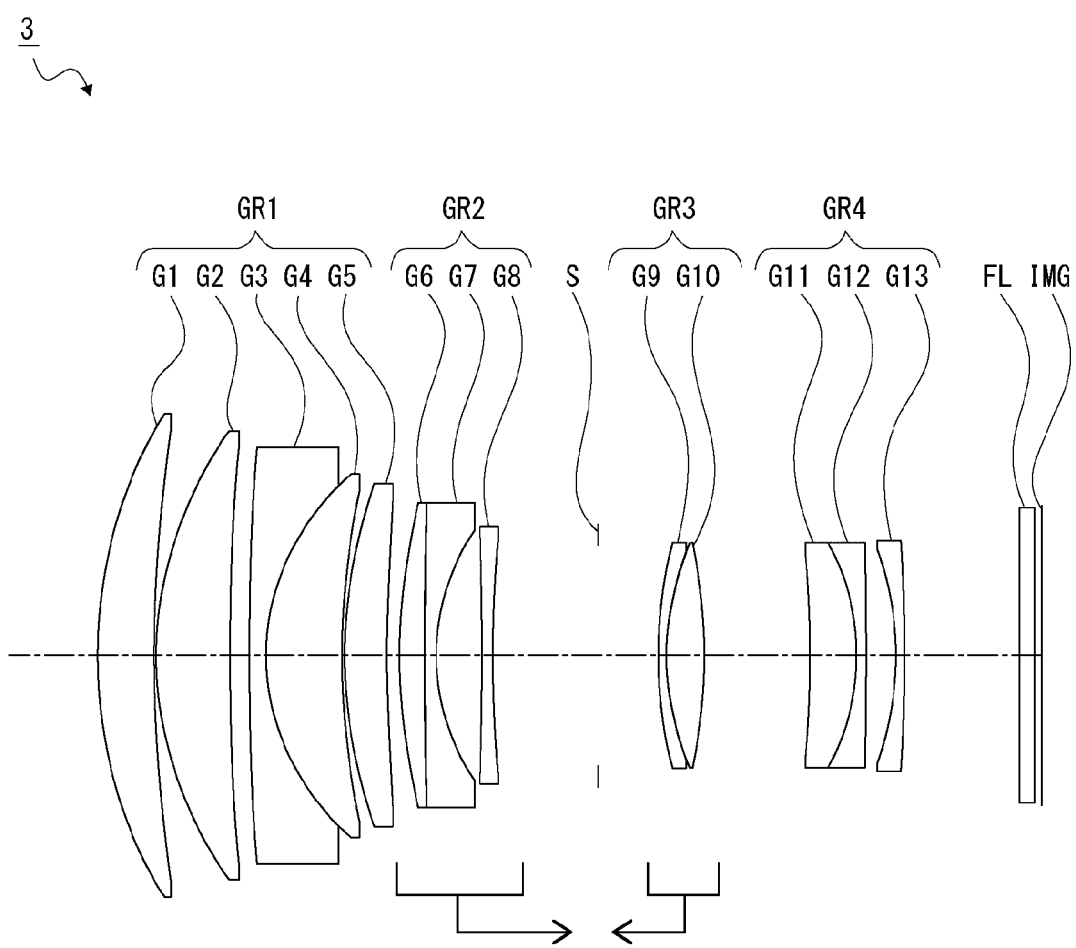
FIG. 11 is a diagram showing a lens configuration of an imaging lens according to a third embodiment.

FIG. 11 shows a lens configuration of an imaging lens 3 according to a third embodiment of the present technology. Solid-line arrows indicate directions in which movable lens groups move at the time of focusing from an object at infinity to an object at close range.

The imaging lens 3 includes a first lens group GR1 having positive refractive power, a second lens group GR2 having negative refractive power, a third lens group GR3 having positive refractive power, and a fourth lens group GR4 having negative refractive power arranged in order from the object side to the image side.

The first lens group GR1 includes a positive lens G1 in a meniscus shape with the convex surface facing the object side, a positive lens G2 in a meniscus shape with the convex surface facing the object side, a negative lens G3 in a meniscus shape with the convex surface facing the object side, a positive lens G4 in a meniscus shape with the convex surface facing the object side, and a positive lens G5 in a meniscus shape with the convex surface facing the object side arranged in order from the object side to the image side.

The second lens group GR2 includes a cemented lens formed by cementing a positive lens G6 in a meniscus shape with the convex surface facing the object side and a negative lens G7 in a meniscus shape with the convex surface facing the object side, and a negative lens G8 in a biconcave shape arranged in order from the object side to the image side.

The second lens group GR2 is provided as a first focus lens group, and moves from the object side to the image side in an optical axis direction at the time of focusing from an object at infinity to an object at close range. The second lens group GR2 includes an object-side lens component having negative refractive power and an image-side lens component having negative refractive power. The object-side lens component includes the positive lens G6 and the negative lens G7. The image-side lens component includes the negative lens G8.

The third lens group GR3 includes a cemented lens formed by cementing a negative lens G9 in a meniscus shape with the convex surface facing the object side and a positive lens G10 in a biconvex shape.

The third lens group GR3 is provided as a second focus lens group, and moves from the image side to the object side in an optical axis direction at the time of focusing from an object at infinity to an object at close range.

The fourth lens group GR4 includes a cemented lens formed by cementing a positive lens G11 in a meniscus shape with the concave surface facing the object side and a negative lens G12 in a meniscus shape with the concave surface facing the object side, and a negative lens G13 in a meniscus shape with the concave surface facing the object side arranged in order from the object side to the image side.

The fourth lens group GR4 is provided as a last lens group, and includes an object-side lens component having positive refractive power and an image-side lens component having negative refractive power. The object-side lens component includes the positive lens G11 and the negative lens G12. The image-side lens component includes the negative lens G13.

A filter FL is disposed between the fourth lens group GR4 and an image surface IMG.

An aperture stop S is disposed between the second lens group GR2 and the third lens group GR3, and is fixed with respect to the image surface IMG.

Table 11 shows lens data of Numerical Example 3 in which specific numerical values are applied to the imaging lens 3.

TABLE 11

| Surface Number | ri | di | ndi | ν di |
|---|---|---|---|---|
| Object Surface | | (d0) | | |
| 1 | 72.238 | 8.7530 | 1.61997 | 63.88 |
| 2 | 236.942 | 0.4 | | |
| 3 | 58.785 | 11.5000 | 1.437 | 95.1 |
| 4 | 396.986 | 2.9435 | | |
| 5 | 413.591 | 2.65 | 1.637 | 38.26 |
| 6 | 36.804 | 0.3 | | |
| 7 | 36.890 | 11.5 | 1.59282 | 68.63 |
| 8 | 125.264 | 0.4 | | |
| 9* | 68.813 | 6.5688 | 1.58313 | 59.38 |
| 10 | 300.000 | (d1) | | |
| 11 | 97.182 | 3.8047 | 1.92286 | 20.88 |
| 12 | 655.288 | 1.9 | 1.8042 | 46.5 |
| 13 | 34.064 | 7.1609 | | |
| 14 | −479.925 | 1.6 | 1.72916 | 54.67 |

TABLE 11-continued

| Surface Number | ri | di | ndi | ν di |
|---|---|---|---|---|
| 15 | 199.482 | (d2) | | |
| 16 (Stop) | ∞ | (d3) | | |
| 17 | 68.902 | 1.25 | 1.74077 | 27.76 |
| 18 | 41.755 | 6 | 1.59282 | 68.63 |
| 19 | −79.305 | (d4) | | |
| 20 | −168.234 | 7.2068 | 1.8061 | 33.27 |
| 21 | −36.922 | 1.29 | 1.51742 | 52.15 |
| 22 | −1699.553 | 5 | | |
| 23 | −46.322 | 1.28 | 1.7859 | 43.93 |
| 24 | −214.545 | 17.7821 | | |
| 25 | ∞ | 2.5 | 1.5168 | 64.2 |
| 26 | ∞ | 1 | | |
| Image Surface | ∞ | | | |

Table 12 shows the fourth-order, sixth-order, eighth-order, and tenth-order aspherical coefficients A, B, C, and D of an aspherical surface in Numerical Example 3 together with a conic constant κ.

TABLE 12

| Surface Number | κ | A | B | C | D |
|---|---|---|---|---|---|
| 9 | 0.000000E+00 | −1.136149E−06 | −3.408227E−10 | 2.714350E−14 | 1.374944E−17 |

Table 13 shows the focal length f, the f-number Fno, the half angle of view ω, the image height Y, and the total optical length L in Numerical Example 3.

TABLE 13

| f | 130.956 |
|---|---|
| Fno | 1.854 |
| ω | 9.38 |
| Y | 21.633 |
| L | 147 |

In the imaging lens 3, at the time of focusing, the surface distance d1 between the first lens group GR1 and the second lens group GR2, the surface distance d2 between the second lens group GR2 and the aperture stop S, the surface distance d3 between the aperture stop S and the third lens group GR3, and the surface distance d4 between the third lens group GR3 and the fourth lens group GR4 change. Table 14 shows variable distances of the surface distances in Numerical Example 3 at infinity, an imaging magnification of −0.03, and the closest range.

TABLE 14

| Imaging Magnification | 0.0 | −0.03 | −0.25 |
|---|---|---|---|
| d0 | ∞ | 3953.4556 | 565.3910 |
| d1 | 2 | 3.0953 | 11 |
| d2 | 16.4866 | 15.3913 | 7.4867 |
| d3 | 9.3178 | 8.3084 | 3 |
| d4 | 16.4058 | 17.4151 | 22.7236 |

Table 15 shows the focal lengths of the lens groups in Numerical Example 3.

TABLE 15

| Group | Starting Surface | Focal Length |
|---|---|---|
| GR1 | 1 | 75.983 |
| GR2 | 11 | −52.091 |
| GR3 | 17 | 69.209 |
| GR4 | 20 | −102.372 |

Figure 12:
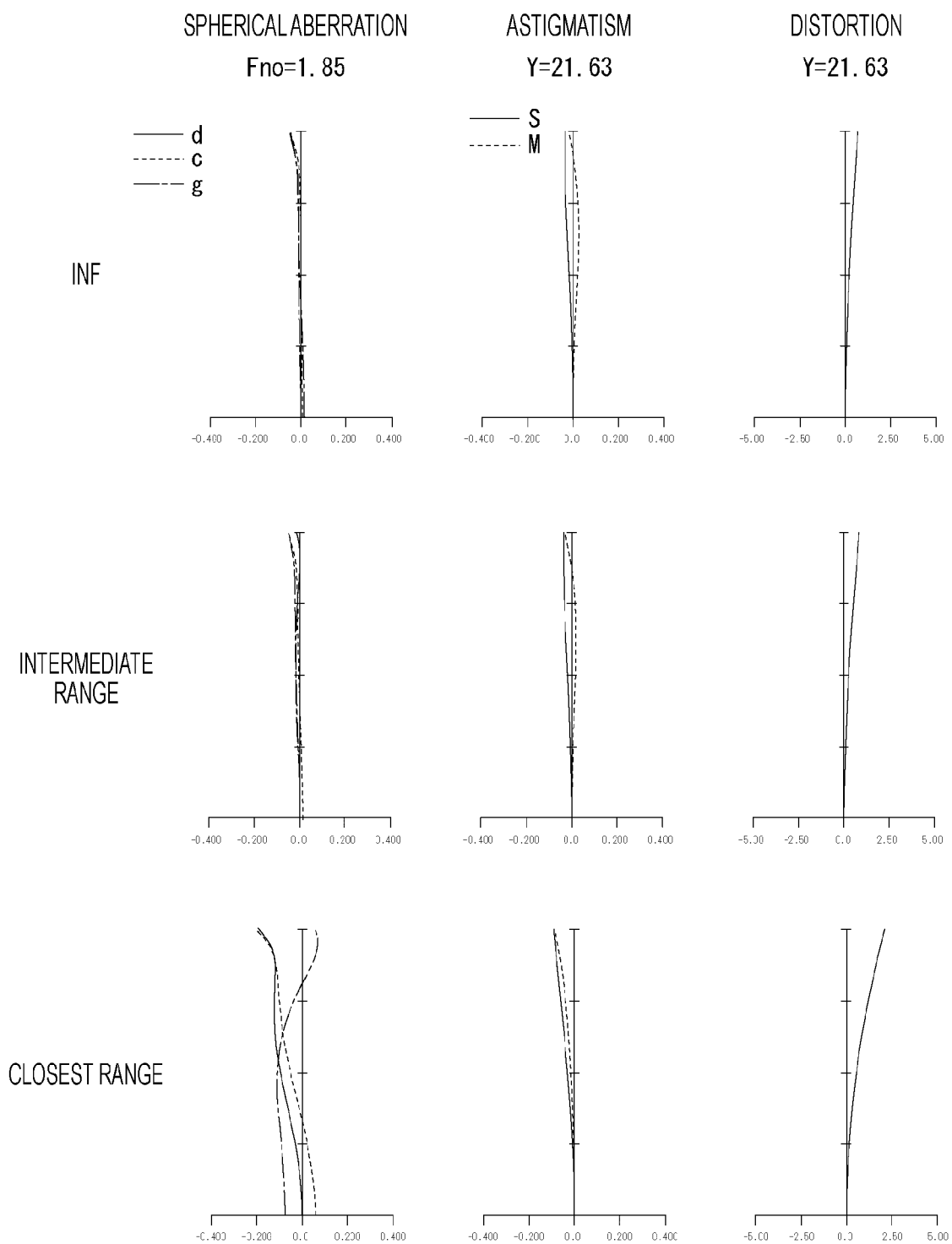
FIG. 12 is a longitudinal aberration diagram in a numerical example in which specific numerical values are applied to the third embodiment, and is a diagram showing spherical aberration, astigmatism, and distortion.
Figure 13:
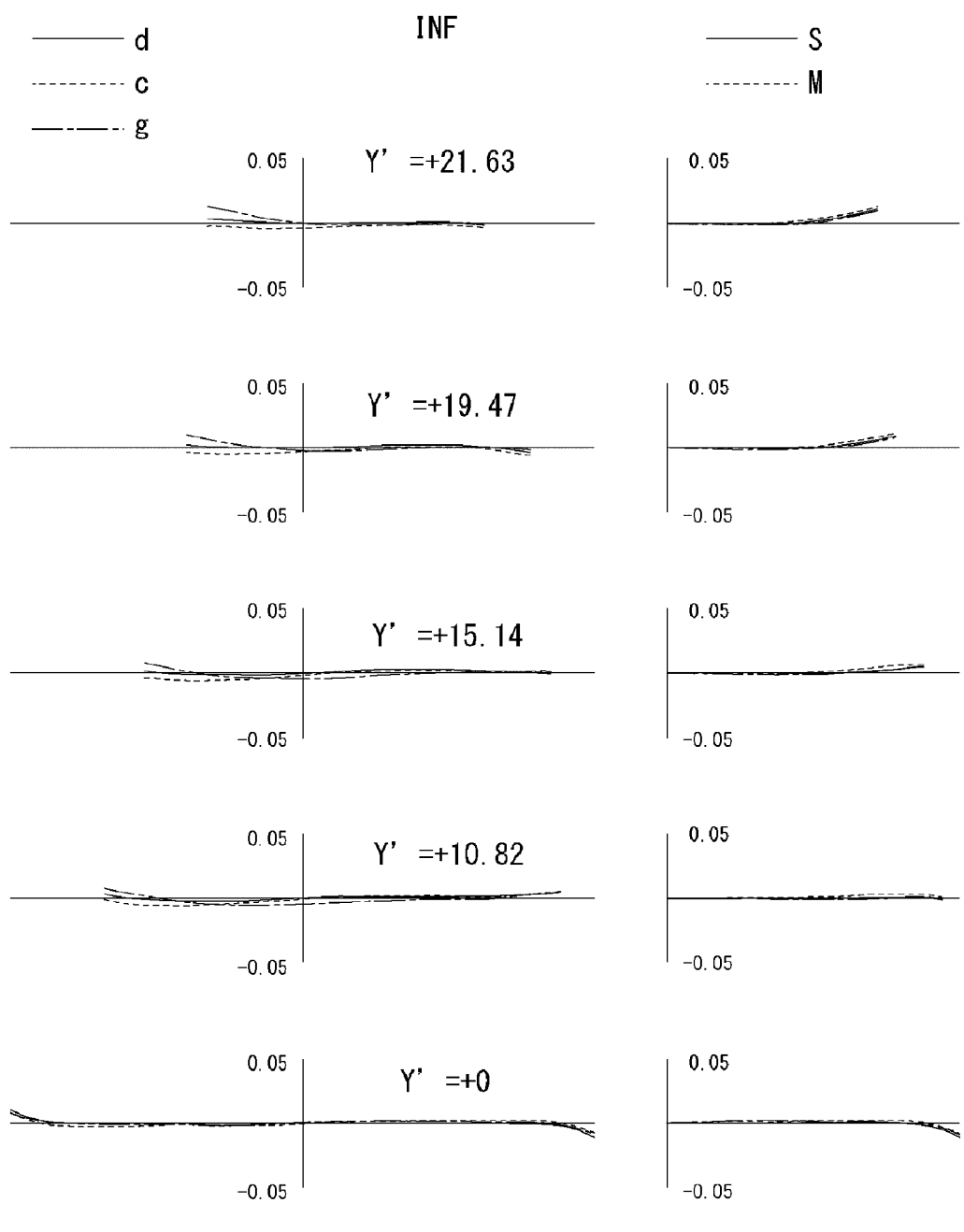
FIG. 13 is a lateral aberration diagram at infinity in the numerical example in which the specific numerical values are applied to the third embodiment.
Figure 14:
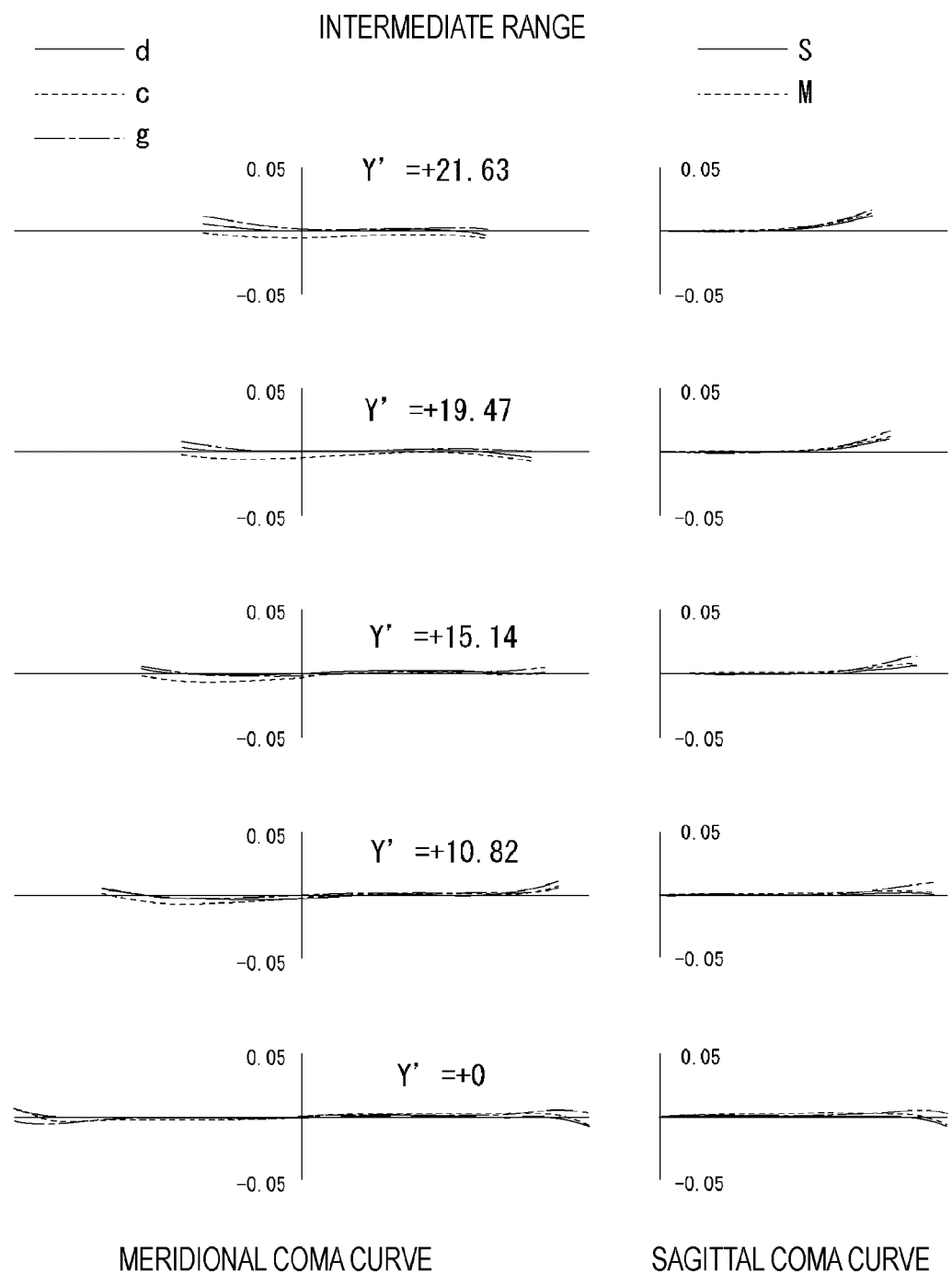
FIG. 14 is a lateral aberration diagram at intermediate range in the numerical example in which the specific numerical values are applied to the third embodiment.
Figure 15:
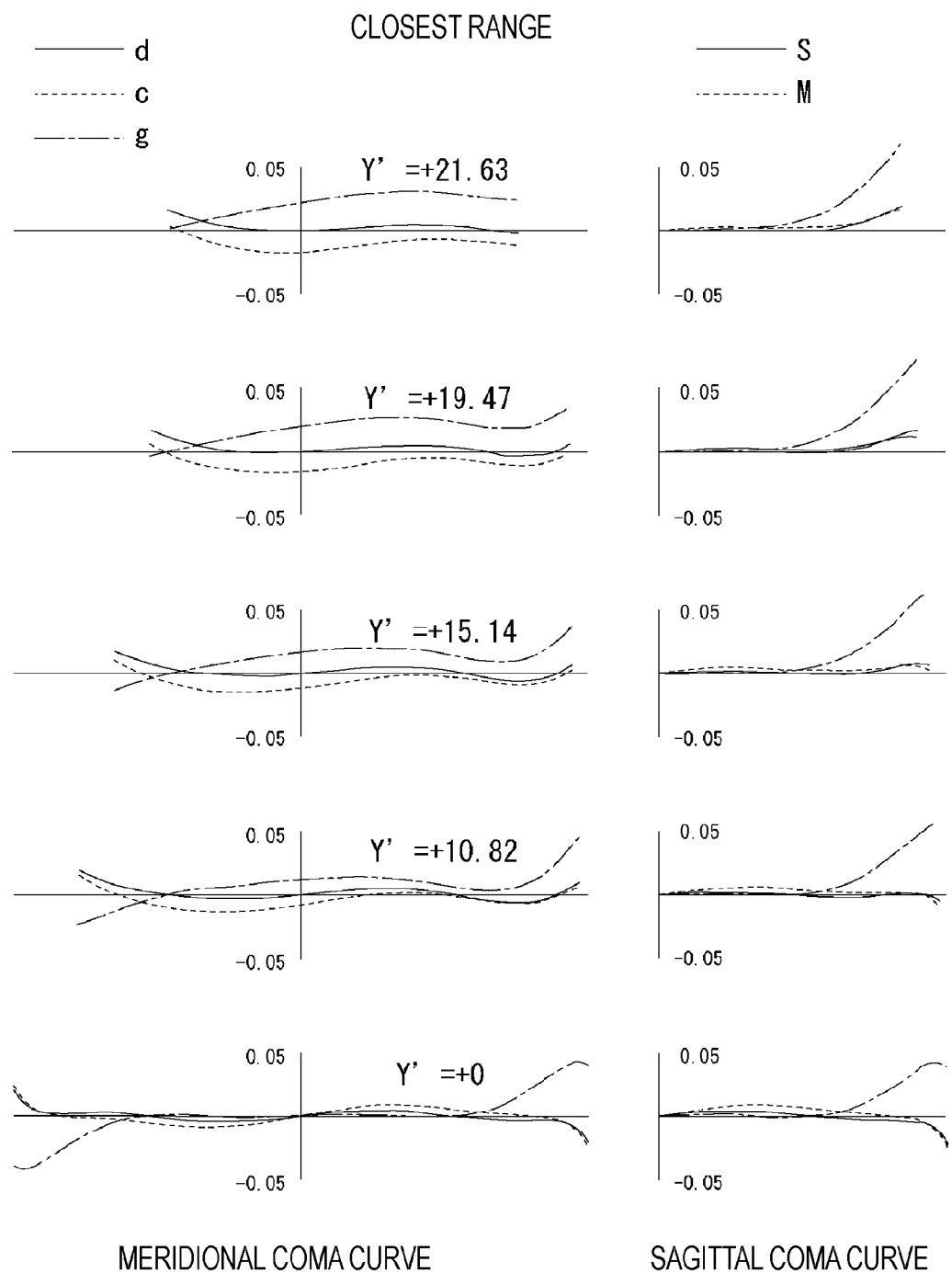
FIG. 15 is a lateral aberration diagram at the closest range in the numerical example in which the specific numerical values are applied to the third embodiment.

FIG. 12 is a longitudinal aberration diagram of Numerical Example 3. FIGS. 13 to 15 are lateral aberration diagrams of Numerical Example 3. FIG. 13 is a lateral aberration diagram at infinity. FIG. 14 is a lateral aberration diagram at intermediate range. FIG. 15 is a lateral aberration diagram at the closest range.

In FIG. 12, in spherical aberration, a solid-line shows the value of the d-line (587.56 nm), a dotted-line shows the value of the c-line (656.27 nm), and a dot-dash line shows the value of the g-line (435.84 nm). In astigmatism, a solid-line shows the value of the d-line in the sagittal image surface, and a broken line shows the value of the d-line in the meridional image surface. In distortion, the value of the d-line is shown. In FIGS. 13 to 15, a solid-line shows the value of the d-line, a dotted-line shows the value of the c-line, a dot-dash line shows the value of the g-line, and Y' represents an image height on an imaging surface.

From the aberration diagrams, it is apparent that Numerical Example 3 favorably corrects various aberrations, and has excellent image formation performance.

Fourth Embodiment

Figure 16:
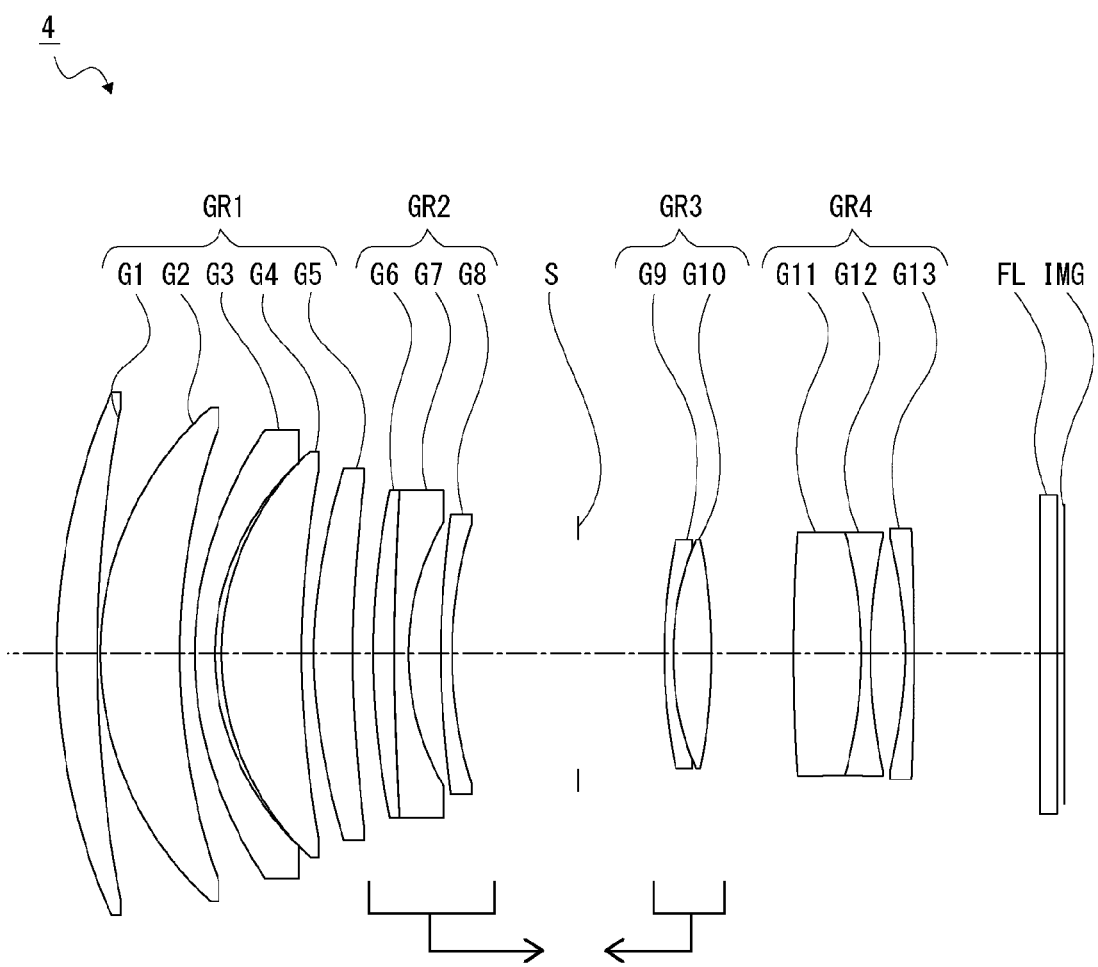
FIG. 16 is a diagram showing a lens configuration of an imaging lens according to a fourth embodiment.

FIG. 16 shows a lens configuration of an imaging lens 4 according to a fourth embodiment of the present technology. Solid-line arrows indicate directions in which movable lens groups move at the time of focusing from an object at infinity to an object at close range.

The imaging lens 4 includes a first lens group GR1 having positive refractive power, a second lens group GR2 having negative refractive power, a third lens group GR3 having positive refractive power, and a fourth lens group GR4 having negative refractive power arranged in order from the object side to the image side.

The first lens group GR1 includes a positive lens G1 in a meniscus shape with the convex surface facing the object side, a positive lens G2 in a meniscus shape with the convex surface facing the object side, a negative lens G3 in a meniscus shape with the convex surface facing the object side, a positive lens G4 in a meniscus shape with the convex surface facing the object side, and a positive lens G5 in a meniscus shape with the convex surface facing the object side arranged in order from the object side to the image side.

The second lens group GR2 includes a cemented lens formed by cementing a positive lens G6 in a meniscus shape with the convex surface facing the object side and a negative lens G7 in a meniscus shape with the convex surface facing the object side, and a negative lens G8 in a meniscus shape with the convex surface facing the object side arranged in order from the object side to the image side.

The second lens group GR2 is provided as a first focus lens group, and moves from the object side to the image side in an optical axis direction at the time of focusing from an object at infinity to an object at close range. The second lens group GR2 includes an object-side lens component having negative refractive power and an image-side lens component having negative refractive power. The object-side lens component includes the positive lens G6 and the negative lens G7. The image-side lens component includes the negative lens G8.

The third lens group GR3 includes a cemented lens formed by cementing a negative lens G9 in a meniscus shape with the convex surface facing the object side and a positive lens G10 in a biconvex shape.

The third lens group GR3 is provided as a second focus lens group, and moves from the image side to the object side in an optical axis direction at the time of focusing from an object at infinity to an object at close range.

The fourth lens group GR4 includes a cemented lens formed by cementing a positive lens G11 in a biconvex shape and a negative lens G12 in a biconcave shape, and a negative lens G13 in a meniscus shape with the concave surface facing the object side arranged in order from the object side to the image side.

The fourth lens group GR4 is provided as a last lens group, and includes an object-side lens component having positive refractive power and an image-side lens component having negative refractive power. The object-side lens component includes the positive lens G11 and the negative lens G12. The image-side lens component includes the negative lens G13.

A filter FL is disposed between the fourth lens group GR4 and an image surface IMG.

An aperture stop S is disposed between the second lens group GR2 and the third lens group GR3, and is fixed with respect to the image surface IMG.

Table 16 shows lens data of Numerical Example 4 in which specific numerical values are applied to the imaging lens 4.

TABLE 16

| Surface Number | ri | di | ndi | ν di |
|---|---|---|---|---|
| Object Surface | | (d0) | | |
| 1 | 91.4472 | 5.8805 | 1.61997 | 63.88 |
| 2 | 182.0945 | 0.4000 | | |
| 3 | 47.0377 | 11.5000 | 1.43700 | 95.10 |
| 4 | 97.0443 | 2.0873 | | |
| 5 | 55.6824 | 2.8955 | 2.00100 | 29.13 |
| 6 | 37.2222 | 0.9793 | | |
| 7 | 39.2118 | 11.5000 | 1.55032 | 75.50 |
| 8 | 143.3030 | 1.7386 | | |
| 9* | 72.9931 | 5.6237 | 1.58313 | 59.38 |
| 10 | 196.3695 | (d1) | | |
| 11 | 122.9030 | 3.0582 | 1.95906 | 17.47 |
| 12 | 442.0137 | 1.9000 | 1.80420 | 46.50 |
| 13 | 37.1784 | 4.6215 | | |
| 14 | 131.0165 | 1.6000 | 1.72916 | 54.67 |
| 15 | 60.4066 | (d2) | | |
| 16 (Stop) | ∞ | (d3) | | |
| 17 | 80.3111 | 1.2500 | 1.74077 | 27.76 |
| 18 | 42.3231 | 5.5000 | 1.61997 | 63.88 |

TABLE 16-continued

| Surface Number | ri | di | ndi | ν di |
|---|---|---|---|---|
| 19 | −87.2511 | (d4) | | |
| 20 | 253.3744 | 9.7391 | 1.80610 | 33.27 |
| 21 | −64.8939 | 1.2900 | 1.51742 | 52.15 |
| 22 | 76.3988 | 5.0000 | | |
| 23 | −65.7371 | 1.2800 | 1.74330 | 49.22 |
| 24 | −473.4994 | 18.0724 | | |
| 25 | ∞ | 2.5000 | 1.51680 | 64.20 |
| 26 | ∞ | 1.0000 | | |
| Image Surface | ∞ | | | |

Table 17 shows the fourth-order, sixth-order, eighth-order, and tenth-order aspherical coefficients A, B, C, and D of an aspherical surface in Numerical Example 4 together with a conic constant κ.

TABLE 17

| Surface Number | κ | A | B | C | D |
|---|---|---|---|---|---|
| 9 | 0.000000E+00 | −1.244522E−06 | −3.451236E−10 | −5.801672E−14 | 9.082220E−17 |

Table 18 shows the focal length f, the f-number Fno, the half angle of view ω, the image height Y, and the total optical length L in Numerical Example 4.

TABLE 18

| | |
|---|---|
| f | 130.957 |
| Fno | 1.854 |
| ω | 9.38 |
| Y | 21.633 |
| L | 144.819 |

In the imaging lens 4, at the time of focusing, the surface distance d1 between the first lens group GR1 and the second lens group GR2, the surface distance d2 between the second lens group GR2 and the aperture stop S, the surface distance d3 between the aperture stop S and the third lens group GR3, and the surface distance d4 between the third lens group GR3 and the fourth lens group GR4 change. Table 19 shows variable distances of the surface distances in Numerical Example 4 at infinity, an imaging magnification of −0.03, and the closest range.

TABLE 19

| Imaging Magnification | 0.0 | −0.03 | −0.25 |
|---|---|---|---|
| d0 | ∞ | 3948.0670 | 566.1408 |
| d1 | 3.0000 | 3.9843 | 10.8471 |
| d2 | 18.1666 | 17.1823 | 10.3195 |
| d3 | 12.4024 | 11.3716 | 5.9569 |
| d4 | 11.8342 | 12.8650 | 18.2799 |

Table 20 shows the focal lengths of the lens groups in Numerical Example 4.

TABLE 20

| Group | Starting Surface | Focal Length |
|---|---|---|
| GR1 | 1 | 69.92 |
| GR2 | 11 | −48.504 |

TABLE 20-continued

| Group | Starting Surface | Focal Length |
|---|---|---|
| GR3 | 17 | 75.229 |
| GR4 | 20 | −117.513 |

Figure 17:
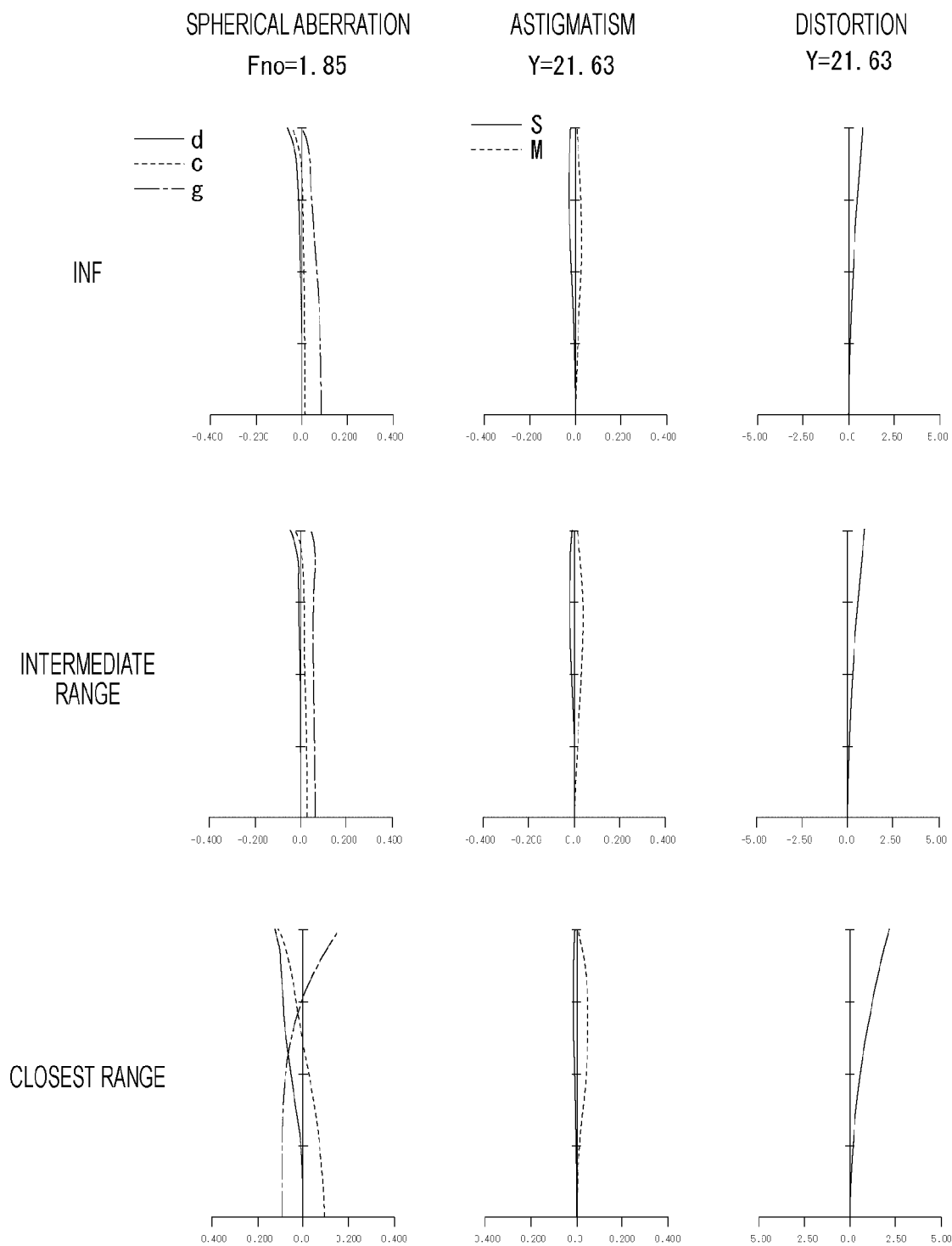
FIG. 17 is a longitudinal aberration diagram in a numerical example in which specific numerical values are applied to the fourth embodiment, and is a diagram showing spherical aberration, astigmatism, and distortion.
Figure 18:
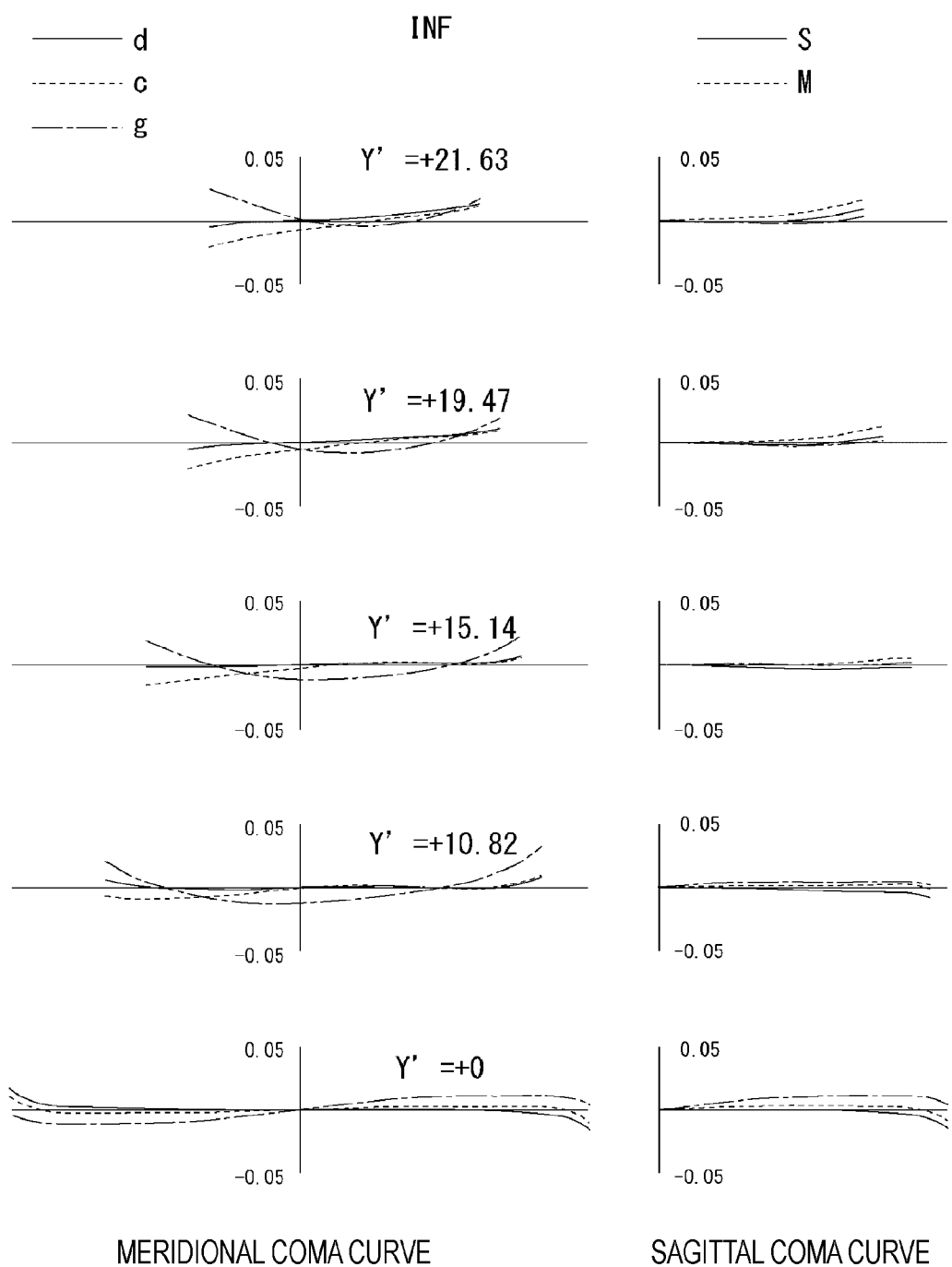
FIG. 18 is a lateral aberration diagram at infinity in the numerical example in which the specific numerical values are applied to the fourth embodiment.
Figure 19:
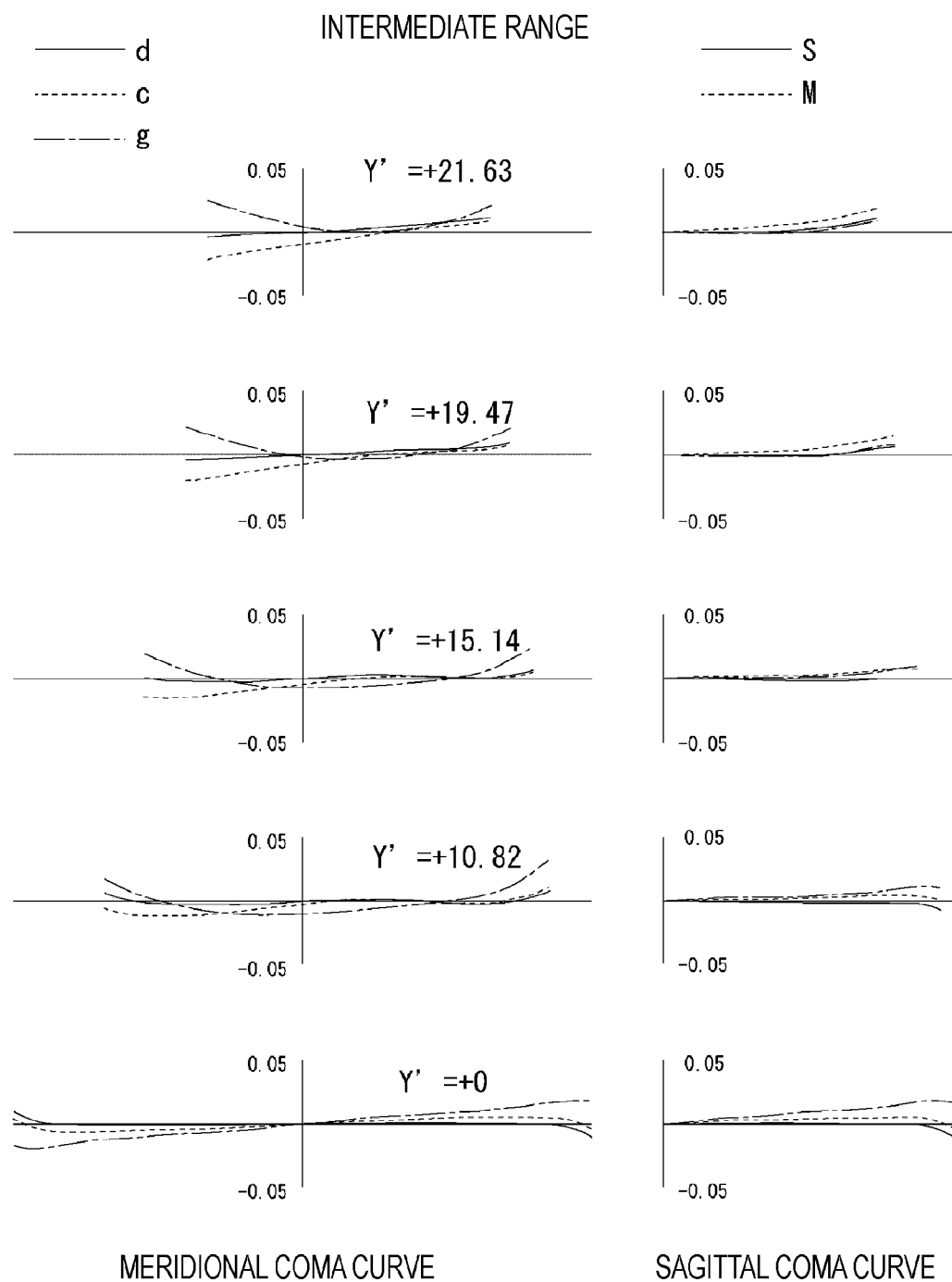
FIG. 19 is a lateral aberration diagram at intermediate range in the numerical example in which the specific numerical values are applied to the fourth embodiment.
Figure 20:
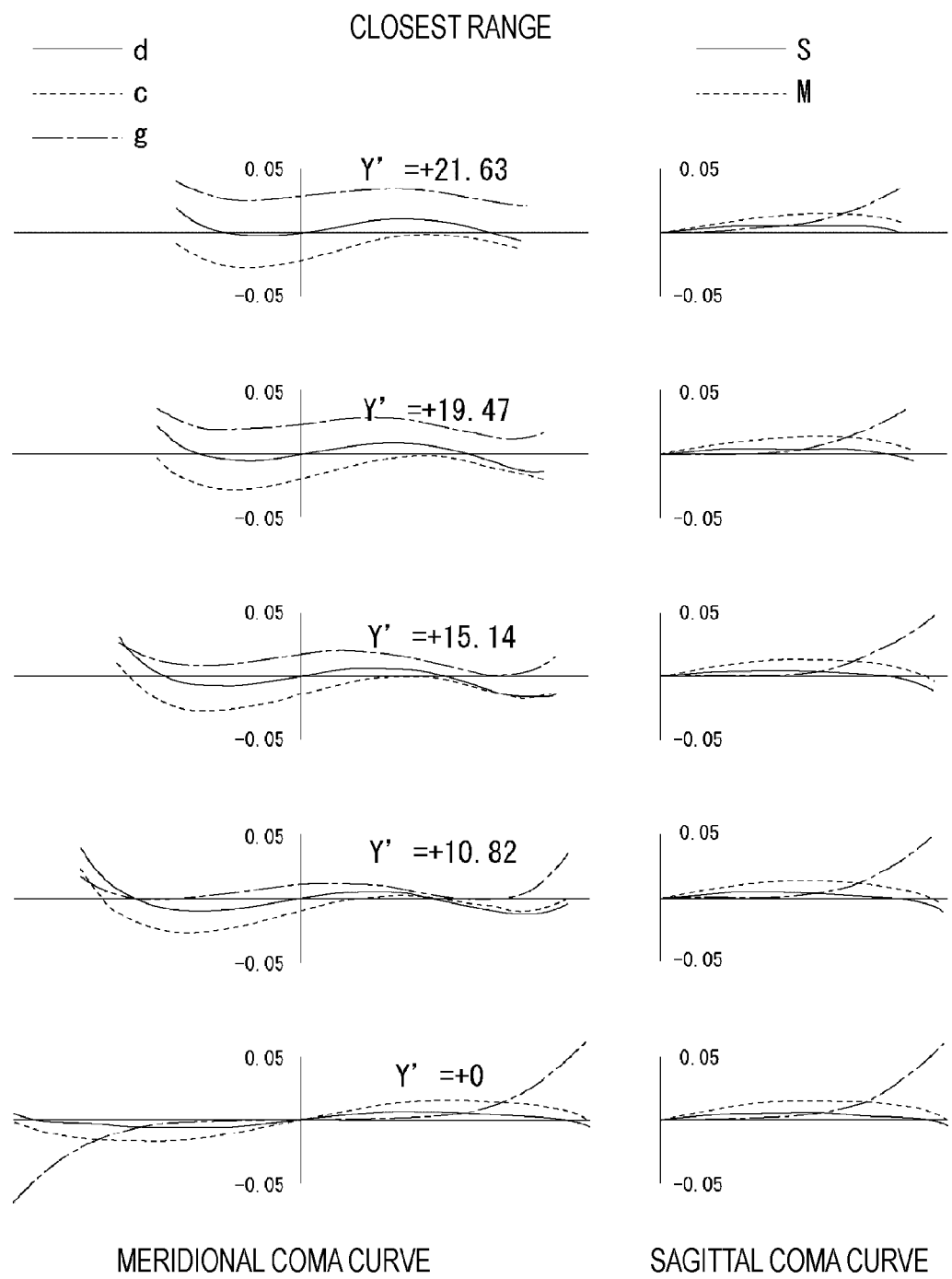
FIG. 20 is a lateral aberration diagram at the closest range in the numerical example in which the specific numerical values are applied to the fourth embodiment.

FIG. 17 is a longitudinal aberration diagram of Numerical Example 4. FIGS. 18 to 20 are lateral aberration diagrams of Numerical Example 4. FIG. 18 is a lateral aberration diagram at infinity. FIG. 19 is a lateral aberration diagram at intermediate range. FIG. 20 is a lateral aberration diagram at the closest range.

In FIG. 17, in spherical aberration, a solid-line shows the value of the d-line (587.56 nm), a dotted-line shows the value of the c-line (656.27 nm), and a dot-dash line shows the value of the g-line (435.84 nm). In astigmatism, a solid-line shows the value of the d-line in the sagittal image surface, and a broken line shows the value of the d-line in the meridional image surface. In distortion, the value of the d-line is shown. In FIGS. 18 to 20, a solid-line shows the value of the d-line, a dotted-line shows the value of the c-line, a dot-dash line shows the value of the g-line, and Y' represents an image height on an imaging surface.

From the aberration diagrams, it is apparent that Numerical Example 4 favorably corrects various aberrations, and has excellent image formation performance.

Fifth Embodiment

Figure 21:
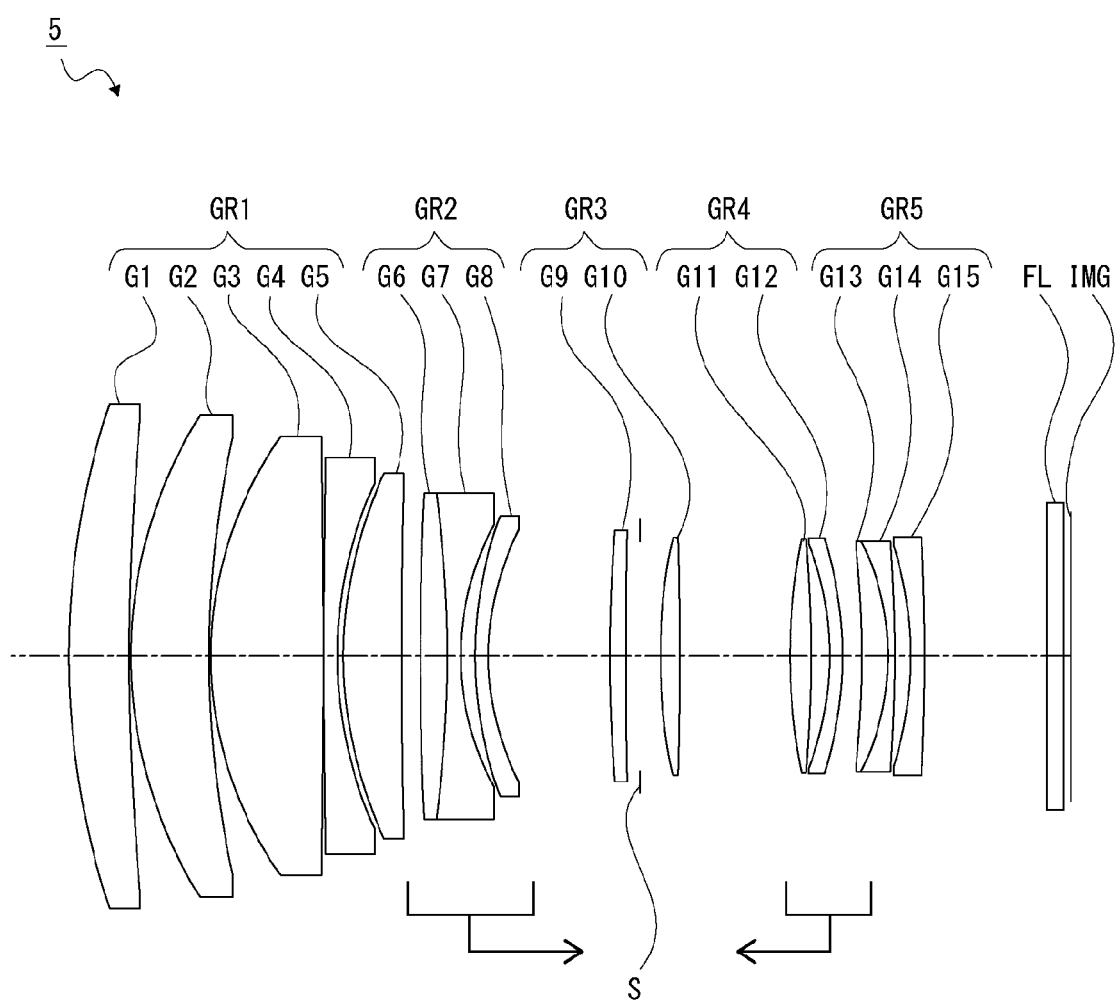
FIG. 21 is a diagram showing a lens configuration of an imaging lens according to a fifth embodiment.

FIG. 21 shows a lens configuration of an imaging lens 5 according to a fifth embodiment of the present technology. Solid-line arrows indicate directions in which movable lens groups move at the time of focusing from an object at infinity to an object at close range.

The imaging lens 5 includes a first lens group GR1 having positive refractive power, a second lens group GR2 having negative refractive power, a third lens group GR3 having positive refractive power, a fourth lens group GR4 having positive refractive power, and a fifth lens group GR5 having negative refractive power arranged in order from the object side to the image side.

The first lens group GR1 includes a positive lens G1 in a meniscus shape with the convex surface facing the object side, a positive lens G2 in a meniscus shape with the convex surface facing the object side, a positive lens G3 in a biconvex shape, a positive lens G4 in a meniscus shape with the convex surface facing the object side, and a positive lens G5 in a biconvex shape arranged in order from the object side to the image side.

The second lens group GR2 includes a cemented lens formed by cementing a positive lens G6 in a biconvex shape and a negative lens G7 in a biconcave shape, and a negative lens G8 in a meniscus shape with the convex surface facing the object side arranged in order from the object side to the image side.

The second lens group GR2 is provided as a first focus lens group, and moves from the object side to the image side in an optical axis direction at the time of focusing from an object at infinity to an object at close range. The second lens group GR2 includes an object-side lens component having negative refractive power and an image-side lens component having negative refractive power. The object-side lens component includes the positive lens G6 and the negative lens G7. The image-side lens component includes the negative lens G8.

The third lens group GR3 includes a positive lens G9 in a meniscus shape with the convex surface facing the object side and a positive lens G10 in a biconvex shape.

The fourth lens group GR4 includes a positive lens G11 in a biconvex shape and a negative lens G12 in a meniscus shape with the concave surface facing the object side.

The fourth lens group GR4 is provided as a second focus lens group, and moves from the image side to the object side in an optical axis direction at the time of focusing from an object at infinity to an object at close range.

The fifth lens group GR5 includes a cemented lens formed by cementing a positive lens G13 in a meniscus shape with the concave surface facing the object side and a negative lens G14 in a meniscus shape with the concave surface facing the object side, and a negative lens G15 in a meniscus shape with the concave surface facing the object side arranged in order from the object side to the image side.

The fifth lens group GR5 is provided as a last lens group, and includes an object-side lens component having positive refractive power and an image-side lens component having negative refractive power. The object-side lens component includes the positive lens G13 and the negative lens G14. The image-side lens component includes the negative lens G15.

A filter FL is disposed between the fifth lens group GR5 and an image surface IMG.

An aperture stop S is disposed between the positive lens G9 and the positive lens G10 of the third lens group GR3, and is fixed with respect to the image surface IMG.

Table 21 shows lens data of Numerical Example 5 in which specific numerical values are applied to the imaging lens 5.

TABLE 21

| Surface Number | ri | di | ndi | ν di |
|---|---|---|---|---|
| Object Surface | | (d0) | | |
| 1 | 118.4087 | 9.0616 | 1.61800 | 63.40 |
| 2 | 378.6408 | 0.2000 | | |
| 3 | 66.6896 | 11.8039 | 1.43700 | 95.10 |
| 4 | 150.1638 | 0.2000 | | |
| 5 | 55.9219 | 16.8902 | 1.43700 | 95.10 |
| 6 | −13960.0000 | 0.1000 | | |
| 7 | 2000.0000 | 2.0000 | 1.85025 | 30.05 |
| 8 | 62.1396 | 0.8594 | | |
| 9 | 63.5502 | 8.8238 | 1.59201 | 67.02 |
| 10* | −2516.5692 | (d1) | | |
| 11 | 475.7445 | 4.0214 | 1.92286 | 20.88 |
| 12 | −183.8657 | 2.0000 | 1.58313 | 59.46 |
| 13 | 40.9992 | 2.1728 | | |
| 14 | 59.0861 | 2.0000 | 1.73800 | 32.26 |
| 15 | 40.5212 | (d2) | | |
| 16 | 253.3959 | 2.4104 | 2.00100 | 29.13 |
| 17 | 788.0514 | 2.1892 | | |
| 18 (Stop) | ∞ | 3.0000 | | |
| 19* | 97.7034 | 2.8340 | 1.58313 | 59.46 |
| 20 | −576.1800 | (d3) | | |
| 21 | 84.0852 | 3.2422 | 1.61340 | 44.27 |
| 22 | −189.1276 | 2.6813 | | |
| 23 | −46.1804 | 2.0000 | 1.48749 | 70.44 |
| 24 | −55.8562 | (d4) | | |
| 25 | −139.8697 | 3.7676 | 2.00100 | 29.13 |
| 26 | −38.5364 | 1.0000 | 1.78472 | 25.72 |
| 27 | −262.3875 | 2.5027 | | |
| 28 | −52.1488 | 2.0000 | 1.95375 | 32.32 |
| 29 | −346.3064 | 18.3247 | | |
| 30 | ∞ | 2.5000 | 1.51680 | 64.20 |
| 31 | ∞ | 1.0000 | | |
| Image Surface | ∞ | | | |

Table 22 shows the fourth-order, sixth-order, eighth-order, and tenth-order aspherical coefficients A, B, C, and D of aspherical surfaces in Numerical Example 5 together with a conic constant κ.

TABLE 22

| Surface Number | κ | A | B | C | D |
|---|---|---|---|---|---|
| 10 | 0.000000E+00 | 1.355522E−06 | −6.081737E−10 | 5.026018E−13 | −2.645571E−16 |
| 19 | 0.000000E+00 | 2.729260E−06 | 5.037576E−10 | 1.695613E−12 | −1.855679E−15 |

Table 23 shows the focal length f, the f-number Fno, the half angle of view ω, the image height Y, and the total optical length L in Numerical Example 5.

TABLE 23

| f | 131.012 |
|---|---|
| Fno | 1.854 |
| ω | 9.38 |
| Y | 21.633 |
| L | 150 |

In the imaging lens 5, at the time of focusing, the surface distance d1 between the first lens group GR1 and the second lens group GR2, the surface distance d2 between the second lens group GR2 and the third lens group GR3, the surface distance d3 between the third lens group GR3 and the fourth lens group GR4, and the surface distance d4 between the fourth lens group GR4 and the fifth lens group GR5 change. Table 24 shows variable distances of the surface distances in Numerical Example 5 at infinity, an imaging magnification of −0.03, and the closest range.

TABLE 24

| Imaging Magnification | 0.0 | −0.03 | −0.25 |
|---|---|---|---|
| d0 | ∞ | 2609.7185 | 534.7139 |
| d1 | 2.7366 | 4.7922 | 14.9323 |
| d2 | 18.1957 | 16.1401 | 6.0000 |
| d3 | 16.4824 | 13.7622 | 6.0000 |
| d4 | 3.0000 | 5.7202 | 13.4824 |

Table 25 shows the focal lengths of the lens groups in Numerical Example 5.

TABLE 25

| Group | Starting Surface | Focal Length |
|---|---|---|
| GR1 | 1 | 85.4 |
| GR2 | 11 | −62.234 |
| GR3 | 16 | 105.035 |
| GR4 | 21 | 114.472 |
| GR5 | 25 | −71.004 |

Figure 22:
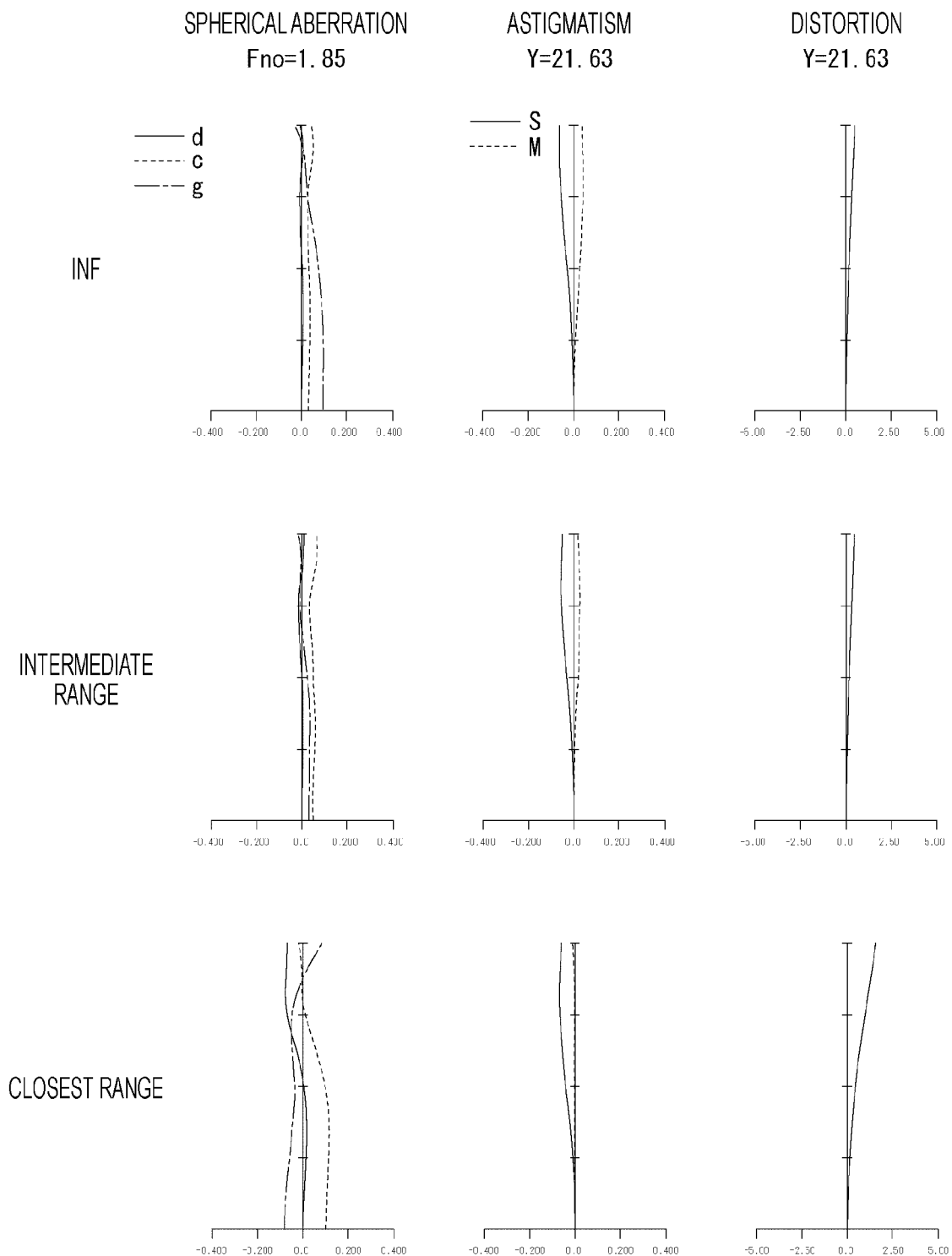
FIG. 22 is a longitudinal aberration diagram in a numerical example in which specific numerical values are applied to the fifth embodiment, and is a diagram showing spherical aberration, astigmatism, and distortion.
Figure 23:
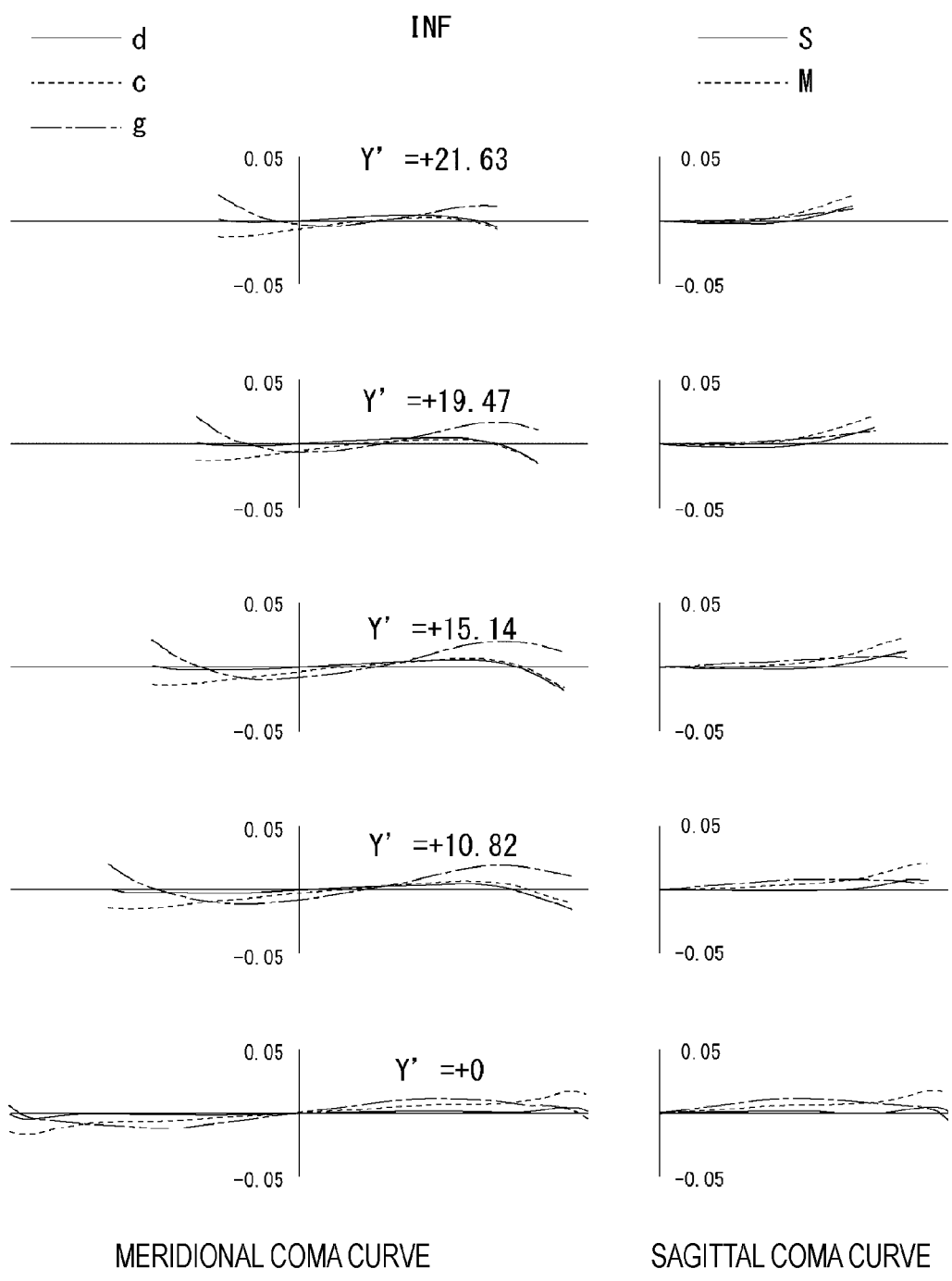
FIG. 23 is a lateral aberration diagram at infinity in the numerical example in which the specific numerical values are applied to the fifth embodiment.
Figure 24:
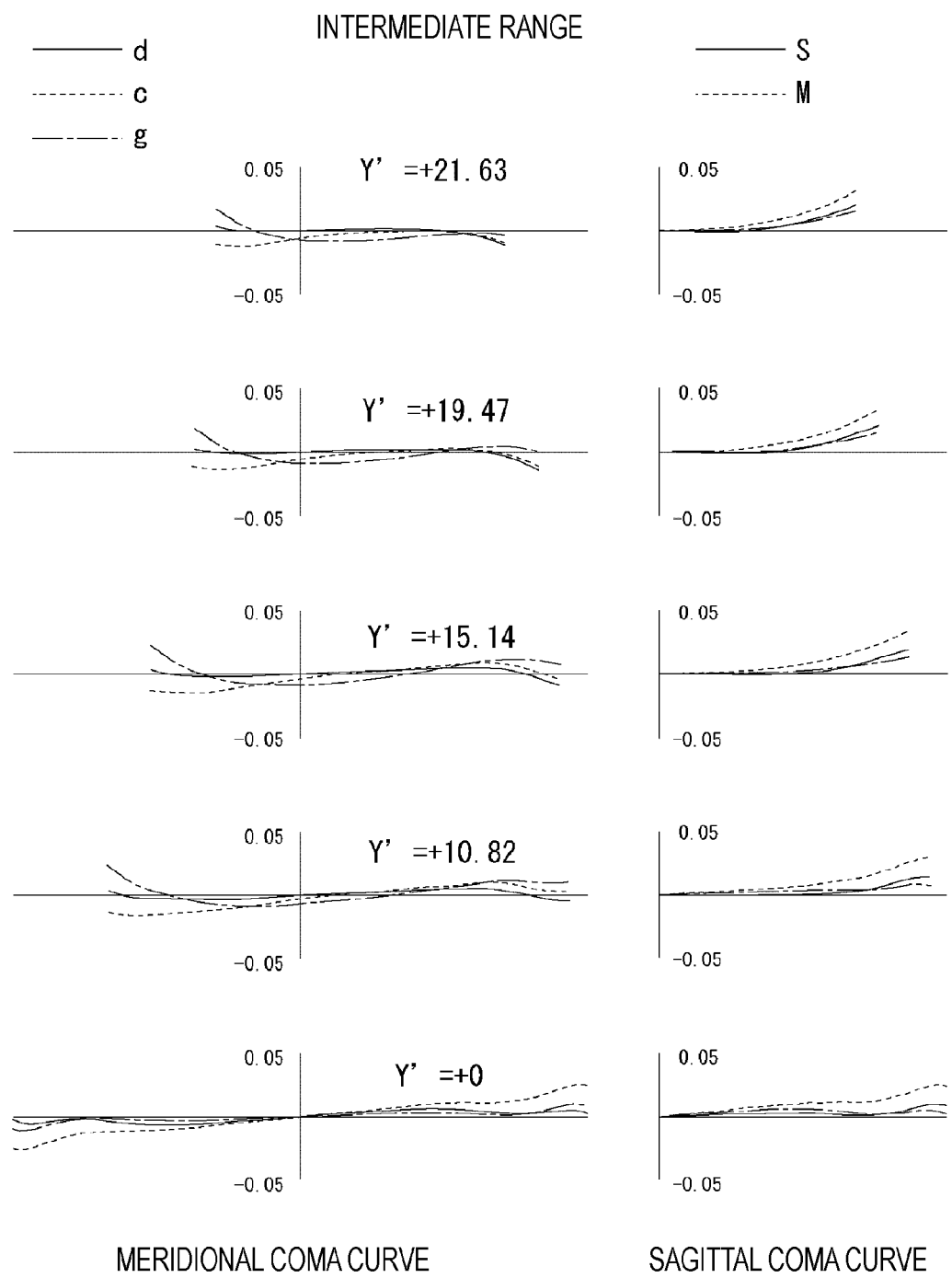
FIG. 24 is a lateral aberration diagram at intermediate range in the numerical example in which the specific numerical values are applied to the fifth embodiment.
Figure 25:
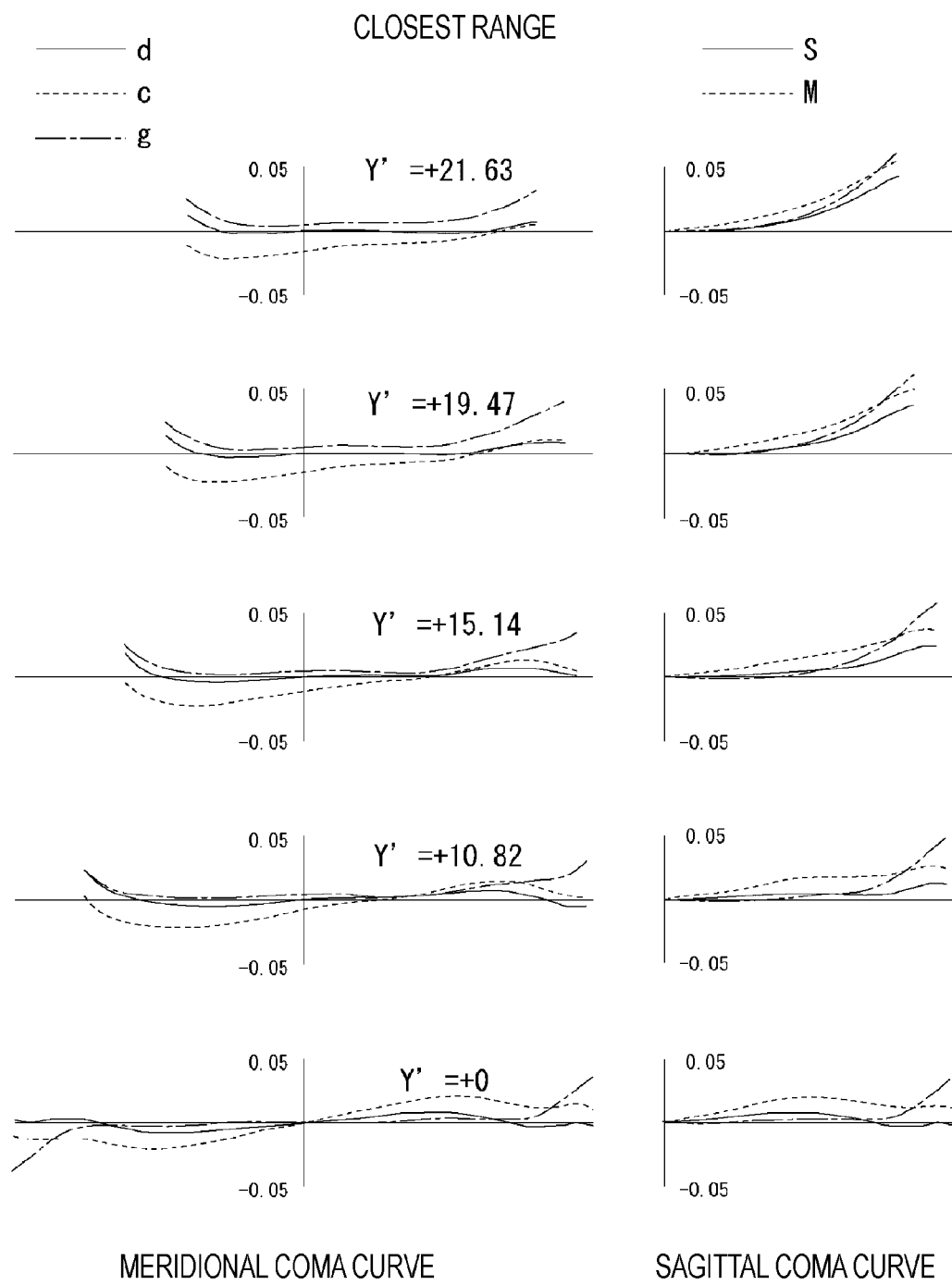
FIG. 25 is a lateral aberration diagram at the closest range in the numerical example in which the specific numerical values are applied to the fifth embodiment.

FIG. 22 is a longitudinal aberration diagram of Numerical Example 5. FIGS. 23 to 25 are lateral aberration diagrams of Numerical Example 5. FIG. 23 is a lateral aberration diagram at infinity. FIG. 24 is a lateral aberration diagram at intermediate range. FIG. 25 is a lateral aberration diagram at the closest range.

In FIG. 22, in spherical aberration, a solid-line shows the value of the d-line (587.56 nm), a dotted-line shows the value of the c-line (656.27 nm), and a dot-dash line shows the value of the g-line (435.84 nm). In astigmatism, a solid-line shows the value of the d-line in the sagittal image surface, and a broken line shows the value of the d-line in the meridional image surface. In distortion, the value of the d-line is shown. In FIGS. 23 to 25, a solid-line shows the value of the d-line, a dotted-line shows the value of the c-line, a dot-dash line shows the value of the g-line, and Y' represents an image height on an imaging surface.

From the aberration diagrams, it is apparent that Numerical Example 5 favorably corrects various aberrations, and has excellent image formation performance.

[Values in Conditional Expressions of Imaging Lens]

Values in conditional expressions of the imaging lens of the present technology will be described below.

Table 26 shows values in Conditional Expressions (1) to (5) in Numerical Examples 1 to 5 of the imaging lenses 1 to 5.

TABLE 26

| Conditional Expression | Lower Limit | Upper Limit | Desirable Lower Limit | Desirable Upper Limit | Example 1 | Example 2 | Example 3 | Example 4 | Example 5 |
|---|---|---|---|---|---|---|---|---|---|
| (1) f/ff | 0.4 | 1.0 | — | 0.8 | 0.483 | 0.700 | 0.406 | 0.469 | 0.418 |
| (2) νFl | — | 22 | — | — | 17.47 | 17.98 | 20.88 | 17.47 | 20.88 |
| (3) θgF | 0.63 | — | — | — | 0.660 | 0.654 | 0.639 | 0.660 | 0.639 |
| (4) (r1 + r2)/(r1 − r2) | 1.0 | 10 | — | 7.5 | 1.496 | 1.591 | 1.195 | 5.033 | 1.064 |
| (5) FGL1/FGL2 | −12 | −1.5 | −10 | — | −3.152 | −3.037 | −3.803 | −10.338 | −9.894 |

As is clear from Table 26, the imaging lenses 1 to 5 are configured to satisfy Conditional Expressions (1) to (5).

[Configuration of Imaging Apparatus]

An imaging apparatus of the present technology has an imaging lens that includes, in order from the object side to the image side, a first lens group always fixed and having positive refractive power, and a first focus lens group that moves in an optical axis direction at the time of focusing from an object at infinity to an object at close range. The imaging lens of the imaging apparatus of the present technology further includes, in order from the image side to the object side, a last lens group always fixed and having negative refractive power, and a second focus lens group that moves in an optical axis direction at the time of focusing from an object at infinity to an object at close range. Moreover, in the imaging lens of the imaging apparatus of the present technology, at least one of the first focus lens group or the second focus lens group has negative refractive power, and an aperture stop is disposed between the first focus lens group and the second focus lens group.

Moving the first focus lens group and the second focus lens group in this manner at the time of focusing provides an advantage in correcting curvature of field and distortion from imaging at infinity to imaging at unity magnification.

Further, by fixing the first lens group with respect to an image surface at the time of focusing, the number of movable groups can be reduced to simplify the mechanical structure.

Moreover, by fixing the last lens group with respect to the image surface at the time of focusing, the number of movable groups can be reduced to simplify the mechanical structure.

Furthermore, fixing the last lens group with respect to the image surface at the time of focusing has the advantage of preventing dust from entering the inside of the imaging lens, in addition to being able to reduce the number of movable groups to simplify the mechanical structure.

Further, by disposing the aperture stop between the first focus lens group and the second focus lens group, refractive power arrangement on the object side and the image side of the aperture stop is optimized, providing an advantage in distortion correction. In a case where a positive lens is disposed on one or both of the object side and the image side of the aperture stop, it is suitable to implement an optical camera shake correction function by moving the positive lens in a direction orthogonal to the optical axis.

The imaging lens of the imaging apparatus of the present technology satisfies Conditional Expression (1) below:

$$0.4<f/ff<1.0 \tag{1}$$

where f: the focal length of the whole system ff: the combined focal length from the first lens group to the first focus lens group.

By satisfying Conditional Expression (1), fairly strongly converged axial rays exit from the first focus lens group to the image side, so that the diameter of the aperture stop located on the image side of the first focus lens group becomes smaller. Furthermore, the lens diameter of the second focus lens group also becomes smaller, and the weight also becomes lighter, so that the second focus lens group can be moved at high speed by an actuator.

On the other hand, if the range of Conditional Expression (1) is exceeded, the absolute values of the refractive powers of the first lens group and the first focus lens group become too large. Consequently, coma and chromatic aberration of magnification cannot be corrected completely, and in addition, the eccentricity sensitivity of the second focus lens group with respect to the first lens group becomes large, making it difficult to stably provide high resolution performance.

On the other hand, if the range of Conditional Expression (1) is not reached, the convergence of axial rays exiting from the first focus lens group is weak, making it difficult to reduce the sizes and weights of the aperture stop and the second focus lens group.

Note that in order to further enhance the effects described above, the range of Conditional Expression (1) is preferably set to the range of Conditional Expression (1)' below:

$$0.4<f/ff<0.8 \tag{1'}$$

where f: the focal length of the whole system ff: the combined focal length from the first lens group to the first focus lens group.

With the configuration as described above, the imaging apparatus of the present technology can achieve higher performance including better performance in focusing. In particular, an imaging lens can be provided which, while having good optical performance at the time of any focusing from an object at infinity to an object at close range, has a small size and a light weight, and is also suitable for capturing moving images.

[Configuration of Another Imaging Apparatus]

Another imaging apparatus of the present technology has an imaging lens that includes, in order from the object side to the image side, a first lens group always fixed and having positive refractive power, and a first focus lens group that moves in an optical axis direction at the time of focusing from an object at infinity to an object at close range. The imaging lens of the another imaging apparatus of the present technology further includes, in order from the image side to the object side, a last lens group always fixed and having negative refractive power, and a second focus lens group that moves in an optical axis direction at the time of focusing from an object at infinity to an object at close range. Moreover, in the imaging lens of the another imaging apparatus of the present technology, at least one of the first focus lens group or the second focus lens group has negative refractive power, and an aperture stop is disposed between the first focus lens group and the second focus lens group.

These components of the another imaging apparatus of the present technology are similar to the components of the imaging apparatus of the present technology described above. The another imaging apparatus of the present technology also provides effects similar to the effects described in the imaging apparatus of the present technology.

Furthermore, the imaging lens of the another imaging apparatus of the present technology satisfies Conditional Expressions (2) and (3) below:

$$vF1<22 \tag{2}$$

$$0.63<\theta gF \tag{3}$$

where vF1: the Abbe number for the d-line of a positive lens of the first focus lens group θgF: the partial dispersion ratio of the positive lens of the first focus lens group.

Conditional Expressions (2) and (3) are expressions related to the anomalous dispersion of the glass material of the positive lens included in the first focus lens group.

One way to shorten the total optical length is to shorten the moving distance of a focus lens group. However, in order to maintain the maximum imaging magnification while shortening the moving distance of the focus lens group, it is necessary to increase the absolute value of the refractive power of the focus lens group.

However, if the refractive power of the focus lens group is increased, it becomes difficult to sufficiently correct the aberration of the focus lens group itself, particularly axial chromatic aberration and spherical aberration. In a case where a plurality of focus lens groups is included, axial chromatic aberration is particularly likely to occur in a focus lens group having a larger axial ray diameter.

In the imaging lens of the another imaging apparatus of the present technology, the axial ray diameter of the first focus lens group is larger than the axial ray diameter of the second focus lens group. Thus, by satisfying Conditional Expressions (2) and (3), axial chromatic aberration can be sufficiently corrected.

On the other hand, if the range of Conditional Expression (2) is exceeded, the correction of axial chromatic aberration occurring in the first focus lens group becomes insufficient.

On the other hand, if the range of Conditional Expression (3) is not reached, the correction of axial chromatic aberration occurring in the first focus lens group becomes insufficient.

With the configuration as described above, the another imaging apparatus of the present technology can achieve higher performance including better performance in focusing, and, in particular, while having good optical performance at the time of any focusing from an object at infinity to an object at close range, can sufficiently correct axis-shaped chromatic aberration.

[Embodiment of Imaging Apparatus]

Figure 26:
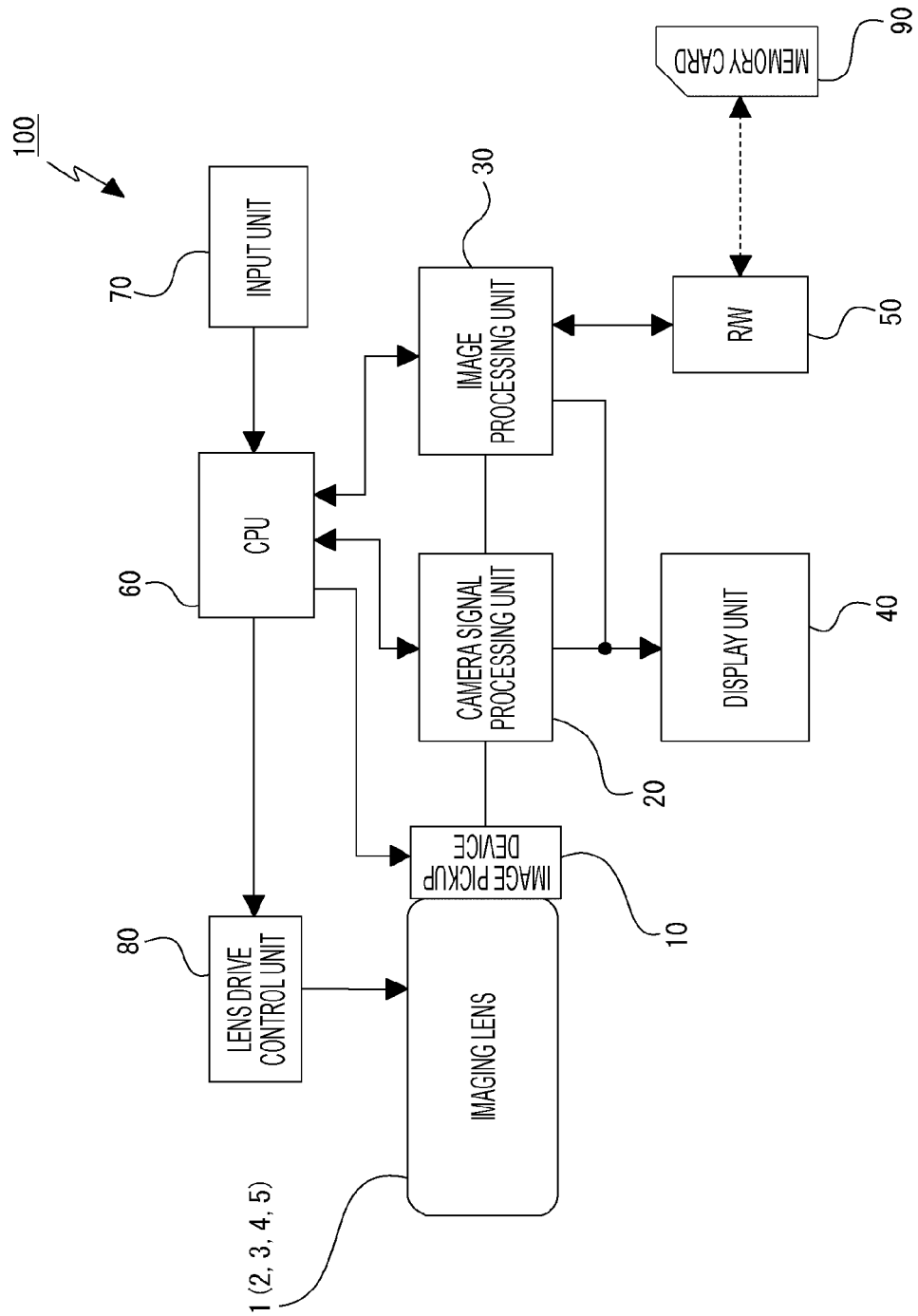
FIG. 26 is a block diagram showing an example of an imaging apparatus.

FIG. 26 shows a block diagram of a digital still camera according to an embodiment of the imaging apparatus of the present technology.

An imaging apparatus (digital still camera) 100 includes an image pickup device 10 having a photoelectric conversion function to convert captured light into electrical signals, a camera signal processing unit 20 that performs signal processing such as analog-digital conversion of captured image signals, and an image processing unit 30 that performs recording and reproduction processing of image signals. The imaging apparatus 100 further includes a display unit 40 that displays captured images and others, a reader/writer (R/W) 50 that writes and reads image signals to and from a memory 90, a central processing unit (CPU) 60 that controls the entire imaging apparatus 100, an input unit 70 such as various switches on which required operations are performed by a user, and a lens drive control unit 80 that controls the drive of lens groups (movable groups).

The camera signal processing unit 20 performs various types of signal processing on signals output from the image pickup device 10, such as conversion into digital signals, noise removal, image quality correction, and conversion into luminance and color-difference signals.

The image processing unit 30 performs compression coding and decompression decoding processing of image signals based on a predetermined image data format, conversion processing of data specifications such as resolution, and the like.

The display unit 40 has a function of displaying various data such as an operating state of the user on the input unit 70 and a captured image.

The R/W 50 writes image data encoded by the image processing unit 30 to the memory 90 and reads image data recorded in the memory 90.

The CPU 60 functions as a control processing unit that controls circuit blocks provided in the imaging apparatus 100, and controls the circuit blocks on the basis of instruction input signals from the input unit 70 and others.

The input unit 70 outputs an instruction input signal corresponding to a user operation to the CPU 60.

The lens drive control unit 80 controls a motor or the like (not shown) that drives the lens groups on the basis of a control signal from the CPU 60.

The memory 90 is, for example, a semiconductor memory that can be removably fitted into a slot connected to the R/W 50. Note that the memory 90 may be incorporated into the imaging apparatus 100 instead of being removably fitted into the slot.

Operation in the imaging apparatus 100 will be described below.

In a standby state for imaging, under the control of the CPU 60, a captured image signal is output to the display unit 40 via the camera signal processing unit 20, and displayed as a camera through image.

When imaging is performed by an instruction input signal from the input unit 70, a captured image signal is output from the camera signal processing unit 20 to the image processing unit 30, and is subjected to the compression coding processing and converted into digital data in the predetermined data format. The converted data is output to the R/W 50 and written into the memory 90.

Focusing is performed by the lens drive control unit 80 moving the focus lens groups on the basis of a control signal from the CPU 60.

In the case of reproducing image data recorded in the memory 90, predetermined image data is read from the memory 90 by the R/W 50 according to an operation on the input unit 70, and is subjected to the decompression decoding processing by the image processing unit 30. Then, a reproduction image signal is output to the display unit 40, and a reproduction image is displayed.

Note that in the present technology, "imaging" means processing including only part or all of a series of processing steps from the photoelectric conversion processing of converting light captured by the image pickup device 10 into electrical signals, to the processing on signals output from the image pickup device 10 by the camera signal processing unit 20, such as conversion into digital signals, noise removal, image quality correction, and conversion into luminance and color-difference signals, the compression coding and decompression decoding processing of an image signal based on the predetermined image data format and the conversion processing of data specifications such as resolution by the image processing unit 30, and the processing of writing an image signal into the memory 90 by the R/W 50.

Specifically, "imaging" may refer only to the photoelectric conversion processing of converting light captured by the image pickup device 10 into electrical signals, or may refer to the photoelectric conversion processing of converting light captured by the image pickup device 10 into electrical signals, to the processing on signals output from the image pickup device 10 by the camera signal processing unit 20, such as conversion into digital signals, noise removal, image quality correction, and conversion into luminance and color-difference signals, or may refer to the photoelectric conversion processing of converting light captured by the image pickup device 10 into electrical signals, through the processing on signals output from the image pickup device 10 by the camera signal processing unit 20, such as conversion into digital signals, noise removal, image quality correction, and conversion into luminance and color-difference signals, to the compression coding and decompression decoding processing of an image signal based on the predetermined image data format and the conversion processing of data specifications such as resolution by the image processing unit 30, or may refer to the photoelectric conversion processing of converting light captured by the image pickup device 10 into electrical signals, through the processing on signals output from the image pickup device 10 by the camera signal processing unit 20, such as conversion into digital signals, noise removal, image quality correction, and conversion into luminance and color-difference signals, and the compression coding and decompression decoding processing of an image signal based on the predetermined image data format and the conversion processing of data specifications such as resolution by the image processing unit 30, may refer to the processing of writing an image signal into the memory 90 by the R/W 50. In the above processing, the order of the processing steps may be appropriately changed.

Furthermore, in the present technology, the shooting apparatus 100 may include only part or all of the image pickup device 10, the camera signal processing unit 20, the image processing unit 30, and the R/W 50 that perform the above processing.

[Others]

In the imaging lens of the present technology and the imaging apparatus of the present technology, another optical element such as a lens having no refractive power may be disposed in addition to the first lens group G1 to the fourth lens group G4 or the first lens group G1 to the fifth lens group G5. In this case, the lens configuration of the imaging lens of the present technology includes substantially four groups or five groups of lenses of the first lens group G1 to the fourth lens group G4 or the first lens group G1 to the fifth lens group G5.

Furthermore, the present technology can provide an imaging lens that, while having a focal length of about 135 mm for a 35 mm-format image sensor and having good optical performance at the time of any focusing from an object at infinity to an object at close range, has a small size and a lightweight and is also suitable for capturing moving images, and an imaging apparatus with this imaging lens.

Note that the example in which the imaging apparatus is applied to the digital still camera has been described above, but the imaging apparatus is not limited in applicable range to the digital still camera, and can be applied widely as a digital video camera, a mobile phone with a camera built in, a camera unit of a digital input/output apparatus such as a personal digital assistant (PDA) with a camera built in, etc.

[The Present Technology]

The present technology can also be configured as below.

<1>

An imaging lens including:

a first lens group always fixed and having positive refractive power, and a first focus lens group that moves in an optical axis direction at a time of focusing from an object at infinity to an object at close range, in order from an object side to an image side;

a last lens group always fixed and having negative refractive power, and a second focus lens group that moves in an optical axis direction at a time of focusing from an object at infinity to an object at close range, in order from the image side to the object side, at least one of the first focus lens group or the second focus lens group having negative refractive power; and an aperture stop disposed between the first focus lens group and the second focus lens group, the imaging lens satisfying Conditional Expression (1) below:

$$0.4<f/ff<1.0 \quad (1)$$

where f: a focal length of a whole system ff: a combined focal length from the first lens group to the first focus lens group.

<2>

The imaging lens according to <1> above, in which the first focus lens group has negative refractive power and moves from the object side to the image side in the optical axis direction at a time of focusing from an object at infinity to an object at close range, and the second focus lens group has positive refractive power and moves from the image side to the object side in the optical axis direction at a time of focusing from an object at infinity to an object at close range.

<3>

The imaging lens according to <1> or <2> above, in which the first focus lens group includes an object-side lens component having negative refractive power and an image-side lens component having negative refractive power, and the object-side lens component is formed by a cemented lens including a positive lens located on the object side and a negative lens located on the image side.

<4>

The imaging lens according to any one of <1> to <3> above, in which a lens located closest to the image side in the first lens group has an aspherical shape on one side or both sides, and the aspherical shape becomes weaker in positive refractive power toward a lens peripheral portion.

<5>

The imaging lens according to any one of <1> to <4> above, in which the first lens group includes at least one meniscus lens having negative refractive power, and the first lens group satisfies Conditional Expression (4) below:

$$1.0<(r1+r2)/(r1-r2)<10 \quad (4)$$

where r1: an object-side surface of a meniscus lens having negative refractive power located closest to the object side in the first lens group r2: an image-side surface of the meniscus lens having the negative refractive power located closest to the object side in the first lens group.

<6>

The imaging lens according to any one of <1> to <5> above, in which the last lens group includes an object-side lens component having positive refractive power and an image-side lens component having negative refractive power, and the last lens group satisfies Conditional Expression (5) below:

$$-12<FGL1/FGL2<-1.5 \quad (5)$$

where

FGL1: a combined focal length of the object-side lens component of the last lens group FGL2: a combined focal length of the image-side lens component of the last lens group.

<7>

An imaging lens including:

a first lens group always fixed and having positive refractive power, and a first focus lens group that moves from an object side to an image side in an optical axis direction at a time of focusing from an object at infinity to an object at close range, includes at least one positive lens, and has negative refractive power, in order from the object side to the image side;

a last lens group always fixed and having negative refractive power, and a second focus lens group that moves from the image side to the object side in an optical axis direction at a time of focusing from an object at infinity to an object at close range, and has positive refractive power, in order from the image side to the object side; and an aperture stop disposed between the first focus lens group and the second focus lens group, the imaging lens satisfying Conditional Expressions (2) and (3) below:

$$\nu F1 < 22 \quad (2)$$

$$0.63 < \theta gF \quad (3)$$

where

νF1: an Abbe number for a d-line of the positive lens of the first focus lens group θgF: a partial dispersion ratio of the positive lens of the first focus lens group.

<8>
The imaging lens according to <7> above, in which
the first focus lens group has negative refractive power and moves from the object side to the image side in the optical axis direction at a time of focusing from an object at infinity to an object at close range, and
the second focus lens group has positive refractive power and moves from the image side to the object side in the optical axis direction at a time of focusing from an object at infinity to an object at close range.

<9>
The imaging lens according to <7> or <8> above, in which
the first focus lens group includes an object-side lens component having negative refractive power and an image-side lens component having negative refractive power, and
the object-side lens component is formed by a cemented lens including a positive lens located on the object side and a negative lens located on the image side.

<10>
The imaging lens according to any one of <7> to <9> above, in which
a lens located closest to the image side in the first lens group has an aspherical shape on one side or both sides, and
the aspherical shape becomes weaker in positive refractive power toward a lens peripheral portion.

<11>
The imaging lens according to any one of <7> to <10> above, in which
the first lens group includes at least one meniscus lens having negative refractive power, and
the first lens group satisfies Conditional Expression (4) below:

$$1.0 < (r1+r2)/(r1-r2) < 10 \quad (4)$$

where
r1: an object-side surface of a meniscus lens having negative refractive power located closest to the object side in the first lens group
r2: an image-side surface of the meniscus lens having the negative refractive power located closest to the object side in the first lens group.

<12>
The imaging lens according to any one of <7> to <11> above, in which
the last lens group includes an object-side lens component having positive refractive power and an image-side lens component having negative refractive power, and
the last lens group satisfies Conditional Expression (5) below:

$$-12 < FGL1/FGL2 < -1.5 \quad (5)$$

where
FGL1: a combined focal length of the object-side lens component of the last lens group
FGL2: a combined focal length of the image-side lens component of the last lens group.

<13>
An imaging apparatus including:
an imaging lens and an image pickup device that converts an optical image formed by the imaging lens into an electrical signal,
the imaging lens including:
a first lens group always fixed and having positive refractive power, and a first focus lens group that moves in an optical axis direction at a time of focusing from an object at infinity to an object at close range, in order from an object side to an image side;
a last lens group always fixed and having negative refractive power, and a second focus lens group that moves in an optical axis direction at a time of focusing from an object at infinity to an object at close range, in order from the image side to the object side,
at least one of the first focus lens group or the second focus lens group having negative refractive power; and
an aperture stop disposed between the first focus lens group and the second focus lens group,
the imaging lens satisfying Conditional Expression (1) below:

$$0.4 < f/ff < 1.0 \quad (1)$$

where
f: a focal length of a whole system
ff: a combined focal length from the first lens group to the first focus lens group.

<14>
An imaging apparatus including:
an imaging lens and an image pickup device that converts an optical image formed by the imaging lens into an electrical signal,
the imaging lens including:
a first lens group always fixed and having positive refractive power, and a first focus lens group that moves from an object side to an image side in an optical axis direction at a time of focusing from an object at infinity to an object at close range, includes at least one positive lens, and has negative refractive power, in order from the object side to the image side;
a last lens group always fixed and having negative refractive power, and a second focus lens group that moves from the image side to the object side in an optical axis direction at a time of focusing from an object at infinity to an object at close range, and has positive refractive power, in order from the image side to the object side; and
an aperture stop disposed between the first focus lens group and the second focus lens group,
the imaging lens satisfying Conditional Expressions (2) and (3) below:

$$\nu F1 < 22 \quad (2)$$

$$0.63 < \theta gF \quad (3)$$

where
vF1: an Abbe number for a d-line of the positive lens of the first focus lens group
θgF: a partial dispersion ratio of the positive lens of the first focus lens group.

REFERENCE SIGNS LIST

1 Imaging lens
2 Imaging lens
3 Imaging lens
4 Imaging lens
5 Imaging lens
GR1 First lens group
GR2 Second lens group
GR3 Third lens group
GR4 Fourth lens group
GR5 Fifth lens group
100 Imaging apparatus
10 Image pickup device

The invention claimed is:

1. An imaging lens comprising:
a first lens group always fixed and having positive refractive power, and a first focus lens group that moves in an optical axis direction at a time of focusing from an object at infinity to an object at close range, in order from an object side to an image side;
a last lens group always fixed and having negative refractive power, and a second focus lens group that moves in an optical axis direction at a time of focusing from an object at infinity to an object at close range, in order from the image side to the object side,
at least one of the first focus lens group or the second focus lens group having negative refractive power; and
an aperture stop disposed between the first focus lens group and the second focus lens group,
the imaging lens satisfying Conditional Expression (1) below:

$$0.4 < f/ff < 1.0 \tag{1}$$

where
f: a focal length of a whole system
ff: a combined focal length of the first lens group and the first focus lens group, wherein
the first focus lens group comprises an object-side lens component having negative refractive power and an image-side lens component having negative refractive power, and
the object-side lens component is formed by a cemented lens comprising a positive lens located on the object side and a negative lens located on the image side.

2. The imaging lens according to claim 1, wherein the first focus lens group has negative refractive power and moves from the object side to the image side in the optical axis direction at a time of focusing from an object at infinity to an object at close range, and
the second focus lens group has positive refractive power and moves from the image side to the object side in the optical axis direction at a time of focusing from an object at infinity to an object at close range.

3. The imaging lens according to claim 1, wherein a lens located closest to the image side in the first lens group has an aspherical shape on one side or both sides, and
the aspherical shape becomes weaker in positive refractive power toward a lens peripheral portion.

4. The imaging lens according to claim 1, wherein the last lens group comprises an object-side lens component having positive refractive power and an image-side lens component having negative refractive power, and
the last lens group satisfies Conditional Expression (5) below:

$$-12 < FGL1/FGL2 < -1.5 \tag{5}$$

where
FGL1: a combined focal length of the object-side lens component of the last lens group
FGL2: a combined focal length of the image-side lens component of the last lens group.

5. An imaging lens comprising:
a first lens group always fixed and having positive refractive power, and a first focus lens group that moves in an optical axis direction at a time of focusing from an object at infinity to an object at close range, in order from an object side to an image side;
a last lens group always fixed and having negative refractive power, and a second focus lens group that moves in an optical axis direction at a time of focusing from an object at infinity to an object at close range, in order from the image side to the object side,
at least one of the first focus lens group or the second focus lens group having negative refractive power; and
an aperture stop disposed between the first focus lens group and the second focus lens group,
the imaging lens satisfying Conditional Expression (1) below:

$$0.4 < f/ff < 1.0 \tag{1}$$

where
f: a focal length of a whole system
ff: a combined focal length of the first lens group and the first focus lens group, wherein
the first lens group includes at least one meniscus lens having negative refractive power, and
the first lens group satisfies Conditional Expression (4) below:

$$1.0 < (r1+r2)/(r1-r2) < 10 \tag{4}$$

where
r1: an object-side surface of a meniscus lens having negative refractive power located closest to the object side in the first lens group
r2: an image-side surface of the meniscus lens having the negative refractive power located closest to the object side in the first lens group.

6. An imaging apparatus comprising:
an imaging lens according to claim 5; and
an image pickup device that converts an optical image formed by the imaging lens into an electrical signal.

7. An imaging apparatus comprising:
an imaging lens and an image pickup device that converts an optical image formed by the imaging lens into an electrical signal,
the imaging lens comprising:
a first lens group always fixed and having positive refractive power, and a first focus lens group that moves in an optical axis direction at a time of focusing from an object at infinity to an object at close range, in order from an object side to an image side;
a last lens group always fixed and having negative refractive power, and a second focus lens group that moves in an optical axis direction at a time of focusing from an object at infinity to an object at close range, in order from the image side to the object side, at least one of the first focus lens group or the second focus lens group having negative refractive power; and an aperture stop disposed between the first focus lens group and the second focus lens group, the imaging lens satisfying Conditional Expression (1) below:

$$0.4 < f/ff < 1.0 \tag{1}$$

where f: a focal length of a whole system ff: a combined focal length from the first lens group to the first focus lens group, wherein the first focus lens group comprises an object-side lens component having negative refractive power and an image-side lens component having negative refractive power, and the object-side lens component is formed by a cemented lens comprising a positive lens located on the object side and a negative lens located on the image side.

* * * * *